United States Patent
Jin et al.

(10) Patent No.: US 12,062,925 B2
(45) Date of Patent: Aug. 13, 2024

(54) FIRST NETWORK NODE, SECOND NODE, WIRELESS DEVICE AND METHODS PERFORMED THEREBY FOR HANDLING CHARGING OF THE WIRELESS DEVICE

(71) Applicant: Telefonaktiebolaget LM Ericsson (publ), Stockholm (SE)

(72) Inventors: Yifei Jin, Solna (SE); Lackis Eleftheriadis, Valbo (SE); Konstantinos Vandikas, Solna (SE); Athanasios Karapantelakis, Solna (SE); Maxim Teslenko, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 165 days.

(21) Appl. No.: 17/772,726

(22) PCT Filed: Oct. 31, 2019

(86) PCT No.: PCT/SE2019/051094
§ 371 (c)(1),
(2) Date: Apr. 28, 2022

(87) PCT Pub. No.: WO2021/086241
PCT Pub. Date: May 6, 2021

(65) Prior Publication Data
US 2022/0399758 A1 Dec. 15, 2022

(51) Int. Cl.
*H02J 50/20* (2016.01)
*H02J 50/40* (2016.01)
*H02J 50/80* (2016.01)
*H04B 5/79* (2024.01)
(Continued)

(52) U.S. Cl.
CPC .............. *H02J 50/20* (2016.02); *H02J 50/40* (2016.02); *H02J 50/80* (2016.02); *H04B 5/79* (2024.01); *H04B 7/022* (2013.01); *H04B 7/0695* (2013.01)

(58) Field of Classification Search
CPC ........ H02J 50/20–27; H02J 50/40–402; H04B 5/0037
See application file for complete search history.

(56) References Cited

U.S. PATENT DOCUMENTS 6,967,462 B1 * 11/2005 Landis .................... H02J 50/80
320/109
9,966,765 B1 * 5/2018 Leabman ................ H02J 50/23
(Continued)

FOREIGN PATENT DOCUMENTS

WO 2019032644 A1 2/2019

*Primary Examiner* — Rexford N Barnie
*Assistant Examiner* — David A Shiao
(74) *Attorney, Agent, or Firm* — Murphy, Bilak & Homiller, PLLC

(57) ABSTRACT

A method performed by a first network node (111). The method is for handling charging of a wireless device (130). The first network node (111) and the wireless device (130) operate in a wireless communications network (100). The first network node (111) modulates (307) one or more beam forming beams (121) in an antenna array (124) controlled by the first network node (111) with a pulse width modulation. The first network node (111) then charges (308), wirelessly, the wireless device (130), with the modulated one or more beam forming beams (121).

18 Claims, 13 Drawing Sheets

(51) Int. Cl.
*H04B 7/022* (2017.01)
*H04B 7/06* (2006.01)

(56) References Cited

U.S. PATENT DOCUMENTS

| | | | | |
|---|---|---|---|---|
| 2007/0093269 | A1* | 4/2007 | Leabman | H04B 7/0874 |
| | | | | 455/562.1 |
| 2010/0079008 | A1* | 4/2010 | Hyde | H02J 50/80 |
| | | | | 250/201.1 |
| 2012/0326660 | A1* | 12/2012 | Lu | H02J 50/20 |
| | | | | 320/108 |
| 2013/0234536 | A1* | 9/2013 | Chemishkian | H02J 50/40 |
| | | | | 307/149 |
| 2014/0312714 | A1* | 10/2014 | Hyde | H02J 50/40 |
| | | | | 307/149 |
| 2014/0354064 | A1* | 12/2014 | Tseliakhovich | H01Q 1/42 |
| | | | | 307/104 |
| 2015/0336669 | A1* | 11/2015 | Kantor | G01C 21/343 |
| | | | | 701/3 |
| 2016/0094092 | A1 | 3/2016 | Davlantes et al. | |
| 2017/0070079 | A1* | 3/2017 | Manova-Elssibony | H02J 7/04 |
| 2019/0047701 | A1* | 2/2019 | Winkle | H02J 7/342 |
| 2019/0173324 | A1 | 6/2019 | Arnitz et al. | |
| 2019/0308514 | A1 | 10/2019 | Parimi et al. | |
| 2019/0341812 | A1* | 11/2019 | Arnstein | B60L 53/36 |
| 2019/0342901 | A1* | 11/2019 | Karabinis | H04W 72/1263 |
| 2020/0036232 | A1* | 1/2020 | Jones | H02J 50/90 |
| 2020/0067341 | A1* | 2/2020 | Glover | H02J 50/80 |
| 2020/0099258 | A1* | 3/2020 | Arnitz | H02J 50/90 |
| 2020/0177029 | A1* | 6/2020 | Homma | H01Q 23/00 |
| 2020/0271708 | A1* | 8/2020 | Kobayashi | H02J 50/80 |
| 2021/0184508 | A1* | 6/2021 | Lee | H02J 50/90 |

* cited by examiner

X: the distance to current cell
Y: the distance from current to destination
Z: the combine heuristic distance a)

b)

a)

b)

FIRST NETWORK NODE, SECOND NODE, WIRELESS DEVICE AND METHODS PERFORMED THEREBY FOR HANDLING CHARGING OF THE WIRELESS DEVICE

TECHNICAL FIELD

The present disclosure relates generally to a first network node, and methods performed thereby, for handling charging of a wireless device. The present disclosure also relates generally to a second node, and methods performed thereby, for handling the charging of the wireless device. The present disclosure additionally relates generally to a wireless device, and methods performed thereby, for handling the charging of the wireless device.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, such as radio network node or Base Station (BS), which sometimes may be referred to as e.g., Transmission Point (TP), Radio Base Station (RBS), gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called 5th Generation (5G) system, from a radio perspective started to be standardized in 3GPP, and the so-called New Radio (NR) is the name for the radio interface. NR architecture is being discussed in 3GPP. In the current concept, gNB denotes an NR BS, where one NR BS may correspond to one or more transmission and/or reception points.

One of the main goals of NR is to provide more capacity for operators to serve ever increasing traffic demands and variety of applications. Because of this, NR will be able to operate on high frequencies, such as frequencies over 6 GHz, until 60 or even 100 GHz.

Operation in higher frequencies makes it possible to use smaller antenna elements, which enables antenna arrays with many antenna elements. Such antenna arrays facilitate beamforming, where multiple antenna elements may be used to form narrow beams and thereby compensate for the challenging propagation properties.

As wireless communications networks grow, maintenance of the network in the field becomes more challenging. In order to assist field engineers to survey RBS sites, and even perform on-site repair and/or part replacements, Field Service Operation (FSO) Unmanned Aerial Vehicles (UAVs) may be used in the FSO process. However, the continuous performance of site surveillance across the cells in a wireless communications network with a UAV may be understood to require a large on board battery storage, while to enable to approach a sector on site to perform repair and/or replacement may be understood to require that the UAVs have a small size.

At present, there are two kinds of UAVs mainly used in current FSO teams. One is a UAV used for surveillance of the shape of the land. This kind of UAV may typically have a strong battery with a high capacity, but it may also have quite a large size. The other kind of UAV may be used for close-site operation, and may be typically small in size. However, its battery may only have a life time of one or two hours. A challenge therefore exists to satisfy the requirements of small size and long battery life, in order to make the use of UAVs a viable solution for FSO procedures without demanding more expensive UAVs and infrastructure.

SUMMARY

It is an object of embodiments herein to improve the handling the charging of a wireless device in a wireless communications network. More particularly, it is an object of embodiments herein to improve the handling the charging of a UAV in the field.

According to a first aspect of embodiments herein, the object is achieved by a method performed by a first network node. The method is for handling charging of a wireless device. The first network node and the wireless device operate in the wireless communications network. The first network node modulates one or more beamforming beams in an antenna array controlled by the first network node with a pulse width modulation. The first network node also charges, wirelessly, the wireless device, with the modulated one or more beamforming beams.

According to a second aspect of embodiments herein, the object is achieved by a method performed by a second network node. The method is for handling the charging of the wireless device. The second network node and the wireless device operate in the wireless communications network. The wireless device is an Unmanned Aerial Vehicle (UAV). The second network node determines a route to be followed by the UAV to reach a destination. The determining is based on at least one of the following options. A first option is a possibility of charging a battery of the UAV via beamforming beams transmitted by one or more first network nodes operating in the wireless communications network along the route. A second option is an estimated amount of energy needed by the UAV along the route. A third option is an estimated amount of available energy in the UAV along the route. The second network node sends an indication to the UAV. The indication indicates the determined route.

According to a third aspect of embodiments herein, the object is achieved by a method performed by the wireless device. The method is for handling the charging of the wireless device by the first network node. The first network node and the wireless device operate in the wireless communications network. The wireless device charges, wirelessly, by receiving, from the first network node, the one or more beamforming beams modulated with the pulse width modulation.

According to a fourth aspect of embodiments herein, the object is achieved by the first network node. The first network node may be considered to be for handling the charging of the wireless device. The first network node and the wireless device are configured to operate in the wireless communications network. The first network node is further configured to modulate the one or more beamforming beams in the antenna array configured to be controlled by the first network node with the pulse width modulation. The first network node is also configured to charge, wirelessly, the wireless device, with the one or more beamforming beams configured to be modulated.

According to a fifth aspect of embodiments herein, the object is achieved by the second node. The second node may be considered to be for handling the charging of the wireless device. The second node and the wireless device are configured to operate in the wireless communications network. The wireless device is configured to be the UAV. The second node is also configured to determine the route to be followed by the UAV to reach the destination. The determining is configured to be based on at least one of the following options. The first option is the possibility of charging the battery of the UAV via the beamforming beams configured to be transmitted by the one or more first network nodes configured to operate in the wireless communications network along the route. The second option is the estimated amount of energy needed by the UAV along the route. The third option is the estimated amount of available energy in the UAV along the route. The second node is also configured to send the indication to the UAV. The indication is configured to indicate the route configured to be determined.

According to a sixth aspect of embodiments herein, the object is achieved by the wireless device. The wireless device may be considered to be for handling the charging of the wireless device by the first network node. The first network node and the wireless device are configured to operate in the wireless communications network. The wireless device is further configured to charge, wirelessly by being configured to receive, from the first network node, the one or more beamforming beams configured to be modulated with the pulse width modulation.

By the first network node modulating the one or more beamforming beams with the pulse width modulation, the first network node is enabled to wirelessly charge the wireless device with the modulated one or more beamforming beams. The first network node may therefore enable the wireless device, e.g., a low-cost UAV, to perform long range site surveillance, without the need to increase its price and/or size or weight. A further advantage of embodiments herein is that they provide a way to have a site communicate with the wireless device via an antenna beam while charging it, and this communication may be further used to change the posture and position of the wireless device to the site.

By the second node determining the route based on the possibility of charging the wireless device with the beamforming beams, the estimated amount of energy needed and/or the estimated amount of available energy in the UAV, the second network node further facilitates that the wireless device, e.g., a low-cost UAV, may perform long range site surveillance without the need to increase its price and/or size or weight. This in turn enables that a UAV may visit multiple sites, without requiring a field technician carry the UAV from site to site.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments may provide solutions to the challenges discussed in the background section. There are, proposed herein, various embodiments which address one or more of the issues disclosed herein.

Figure 1:
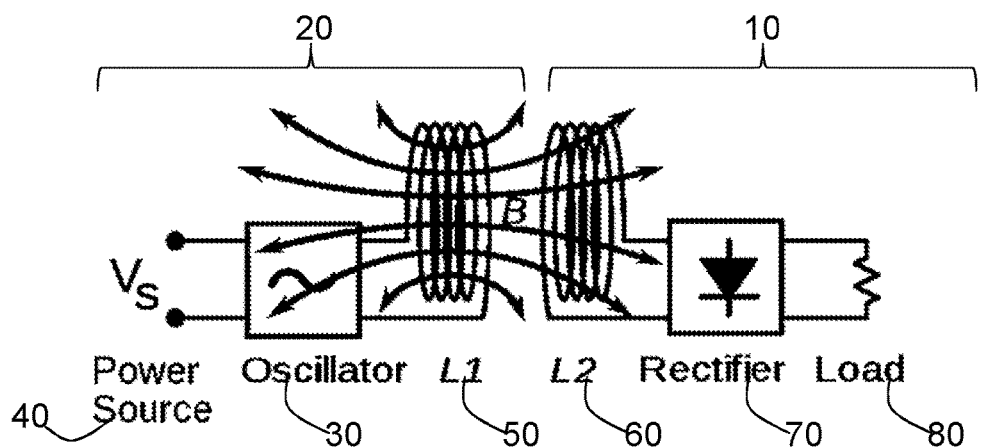
FIG. 1 is a schematic diagram illustrating an example of a wireless charging arrangement, according to existing methods.

Embodiments herein may be understood to be related to providing a mechanism to allow a wireless device to recharge its battery in the field, rather than increasing its cost and/or increasing the size of its battery to increase its capacity, and thereby increase its overall size and weight. In existing methods, it is possible to charge devices wirelessly with techniques known as Wireless Power Transfer (WPT). FIG. 1 is a schematic diagram illustrating a typical, simplified WPT arrangement. The typical components may comprise a receiver 10, a transmitter 20 and an oscillator 30. The transmitter 20 may incorporate a power supply 40, the oscillator 30 and an inductor L1 50, while the receiver 10 may incorporate another inductor L2 60, a rectifier 70 and the load 80. The matching arrangement may be made on the inductor 50 to transfer the energy from one side to the other, in the same frequency. The energy to the receiver 10 side, may vary, and may depend on distance, matching and capacity of the inductors 50, 60. Matching may be understood to refer to a matching of frequency and impedance of the inductors 50, 60, to enable transfer of energy. The transmitter 20, on the other hand, may need the oscillator 30 to create the dynamics on the transmitter 20 and the inductor 60 in the receiver 10, and fulfil the law of induction, $U=L*dI/dt$. The inductor 60 in the receiver 10 may have the ability to receive the wave, and convert it to power, after rectification with the rectifier 70.

In a general sense, embodiments herein may be understood to relate to a mechanism to wirelessly charge wireless devices such as UAVs and Internet of Things (IoT) devices. More particularly, embodiments herein may be understood to relate to antenna beams for wireless charging of UAV and IoT devices. Embodiments herein may also be understood to relate to methods that allow the usage of the power of antenna beams to perform wireless charging of FSO UAVs. Embodiments herein may further relate to methods to adapt a short-ranged, low-cost FSO UAV to perform long-distance FSO tasks, by performing wireless charging through the mid-point of its trip between the sites, that is, between network nodes and/or cells.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 2:
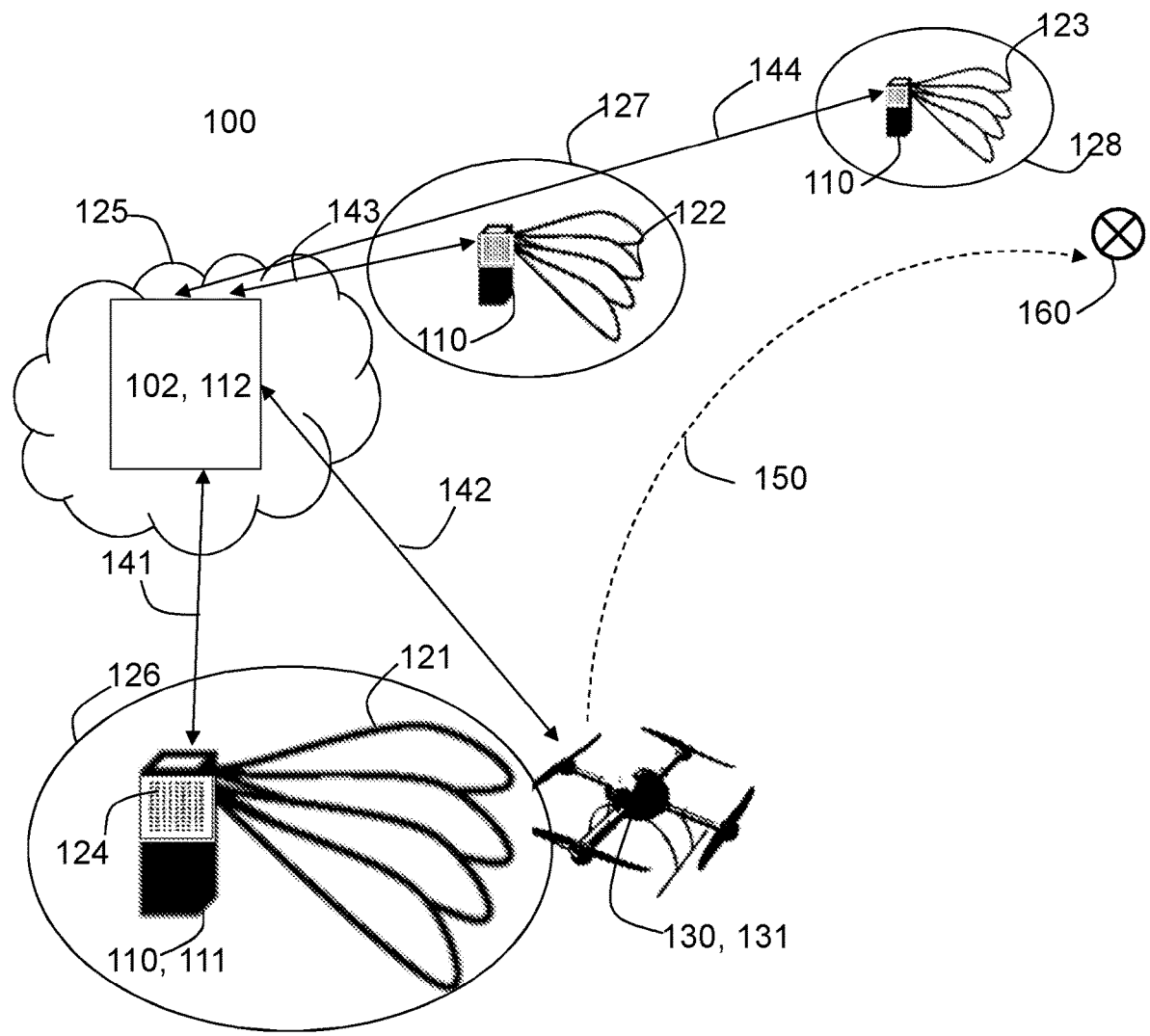
FIG. 2 is a schematic diagram illustrating a wireless communications network, according to embodiments herein.

FIG. 2 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, NR-U or Next Gen System or network, LAA, or MulteFire. The wireless communications network 100 may alternatively be a younger system than a 5G system. The wireless communications network 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, Narrow Band Internet of Things (NB-IoT), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), and/or any cellular network or system.

Thus, although terminology from 5G/NR and LTE may be used in this disclosure to exemplify embodiments herein, this should not be seen as limiting the scope of the embodiments herein to only the aforementioned systems.

The wireless communications network 100 may comprise a plurality of nodes, such as, for example, network nodes, whereof one or more first nodes comprising a first node are depicted in the non-limiting example of FIG. 2, as well as a second node 102. The one or more first nodes are network nodes, and are therefore referred to herein as one or more first network nodes 110 comprising the first node, which is a first network node 111. The second node 102 may be, in some examples a second network node 112, as depicted in the example of FIG. 2. In other examples, the second node 102 may be a wireless device, such as the wireless device 130 described below. Any of the one or more first network nodes 110 and the second network node 112 may be a radio network node, such as a radio base station, or any other network node with similar features capable of serving a user equipment, such as a wireless device or a machine type communication device, in the wireless communications network 100. Any of the one or more first network nodes 110 may be capable of respectively serving a user equipment, such as a wireless device or a machine type communication device, with beamforming beams 121, 122, 123, wherein each of the one or more first network nodes 110 may respectively transmit a respective subset of beamforming beams 121, 122, 123, as depicted in FIG. 2.

Particularly, the first network node 111, is capable of serving a user equipment, such as a wireless device or a machine type communication device with one or more beamforming beams 121. The one or more beamforming beams 121 may be transmitted from an antenna array 124 controlled by the first network node 111. The same may apply to the other first network nodes of the one or more first network nodes 110, as schematically depicted in FIG. 2.

The second node 102 may also have, in some examples, beamforming capability. The second node 102 may be understood to have a capability to plan a route for a user equipment. In some examples, the second node 102 may comprise a Route Planning Component (RPC) deployed in the core network of the wireless communications network 100. An RPC may be understood as a logical component, and it may reside either in the radio access network, operating in distributed fashion as part of radio base stations, in the core network, operating as a centralized node, or, as mentioned earlier, in some examples, in the wireless device, such as the wireless device 130 described below.

In some embodiments, the first network node 111 may be a first gNB, and the second network node 112 may be a second gNB. Any of the first network node 111, and the second network node 112 may be of different classes, such as, e.g., macro base station (BS), home BS or pico BS, based on transmission power and thereby also cell size. Any of the first network node 111 and the second network node 112 may be directly connected to one or more core networks, which are not depicted in FIG. 2 to simplify the figure. In some examples, any of the first network node 111, and the second network node 112 may be co-localized, or be part of the same network node. In some examples, any of the first network node 111, and the second network node 112 may be a distributed node, such as a virtual node in the cloud 125, and it may perform its functions entirely on the cloud 125, or partially, in collaboration with a radio network node. In some examples such as the particular non-limiting example depicted in FIG. 2, the second network node 112 may be a core network node in the cloud 125 and the first network node 111 may be a gNB.

The wireless communications network 100 covers a geographical area which may be divided into cell areas, wherein each cell area may be served by a network node, although, one network node may serve one or several cells. In the non-limiting example of FIG. 2, the wireless communications network 100 comprises a first cell 126, a second cell 127 and a third cell 128. In FIG. 2, the first network node 111 serves the first cell 126. The second cell 127 and the third cell 128 are respectively served by other first network nodes of the one or more first network nodes 110.

A plurality of wireless devices may be located in the wireless communication network 100, whereof a wireless device 130, which may also be referred to simply as a device, is depicted in the non-limiting example of FIG. 2. The wireless device 130, e.g., a 5G UE, may be a wireless communication device which may also be known as e.g., a UE, a mobile terminal, wireless terminal and/or mobile station, a mobile telephone, cellular telephone, IoT device, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. In some embodiments herein, the wireless device 130 may be an Unmanned Aerial Vehicle (UAV) 131, commonly known as a drone. A particular non-limiting example of the UAV 131 may be the DJI Mavic Air battery, other battery and/or energy storage technology, which has a maximum charging power of 60 W, a maximum charging voltage of 13.2V, a capacity of 2375 mAh, an energy of 27.43 Wh, a flying voltage of 11.55V, and a fly time duration of 20 min.

The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100. The wireless device 130 may also have beamforming capability itself.

The first network node 111 may be configured to communicate in the wireless communications network 100 with the second node 102 over a first link 141, e.g., a radio link or a wired link, although communication over more links may be possible. The second node 102 may be configured to communicate in the wireless communications network 100 with the wireless device 130 over a second link 142, e.g., a radio link, or, if the second node 102 is co-located or comprised in the wireless device 130, a wired link. The first network node 111 may be configured to communicate in the wireless communications network 100 with the wireless device 130 over any of the one or more beamforming beams 121. Any of the other first network nodes of the one or more first network nodes 110 may be configured to respectively communicate in the wireless communications network 100 with the wireless device 130 over the respective subset of beamforming beams 122, 123.

Also depicted in FIG. 2 are a route 150 that may be followed by the wireless device 130 to a destination 160.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

Figure 3:
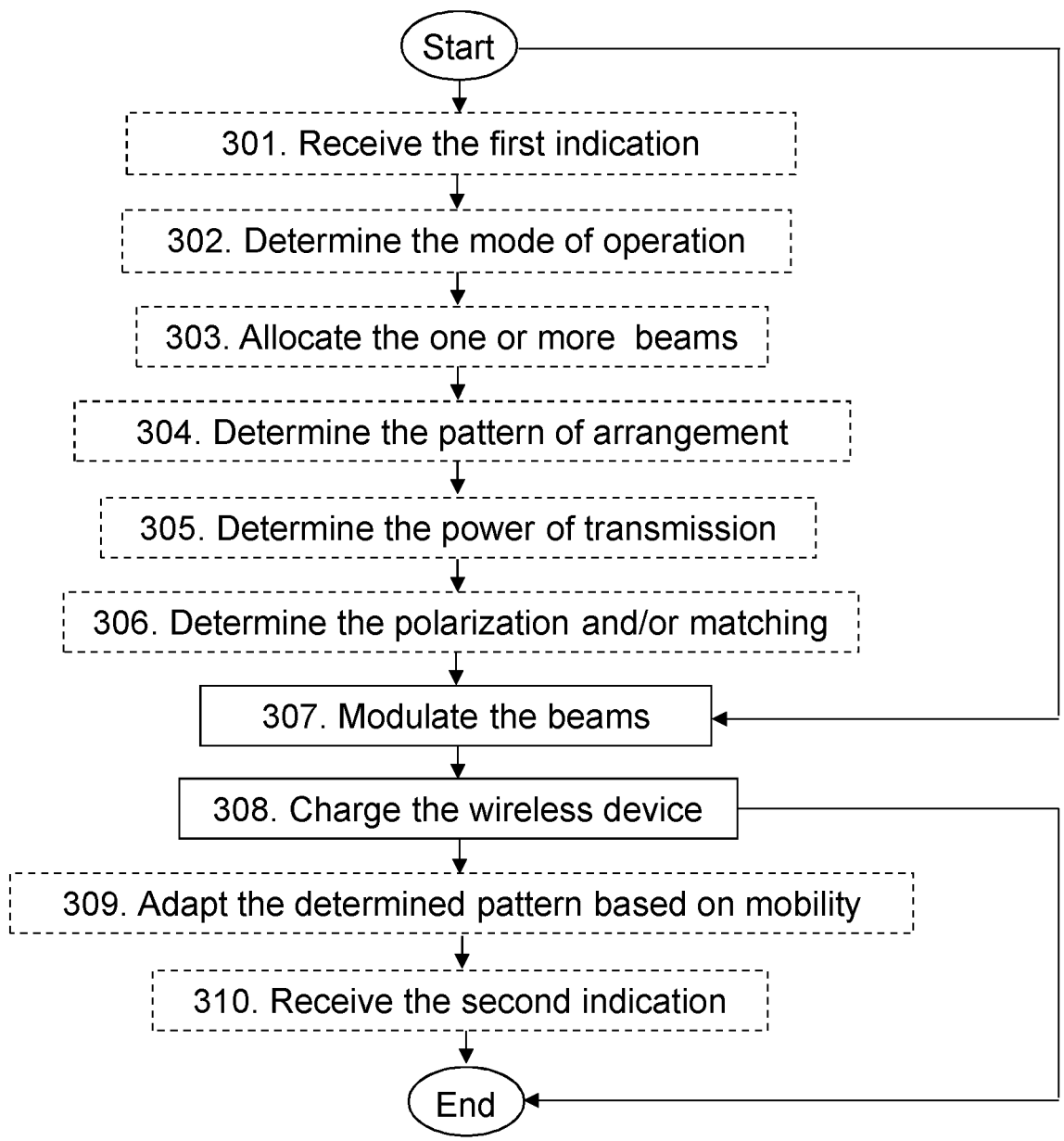
FIG. 3 is a flowchart depicting a method in a first network node, according to embodiments herein.

Embodiments of method, performed by the first network node 111, will now be described with reference to the flowchart depicted in FIG. 3. The method may be understood to be for handling charging of the wireless device 130. The first network node 111 and the wireless device 130 operate in the wireless communications network 100. In some examples, the first network node 111 may be a Beam Forming Manager (BFM) on a radio unit of the first network node 111.

The method may comprise the actions described below. In some embodiments some of the actions may be performed. In some embodiments all the actions may be performed. In FIG. 3, optional actions are indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 301

In this Action 301, the first network node 111 may receive, from the wireless device 130, a first indication. The first indication requests a start of a charging session. This Action 301 may typically take place whenever the wireless device 130 may be approaching the first network node 111, and may be in need to recharge its battery.

In this Action 301, the receiving may be implemented, e.g., via the one or more beamforming beams 121.

The first indication may be implemented for example, by creating a new reference signal, that may be sent to activate the energy charging need, or by creating a new UE and/or UAV Battery power indication, to inform a network node about a battery status of a UE and/or UAV.

Action 302

In this Action 302, the first network node 111 may determine a mode of operation of at least one of the one or more beamforming beams 121. The mode of operation may be selected from: a charging mode and a non-charging mode, which may be also referred to as a regular operation mode or default operation mode. In other words, for example, once the wireless device 130 may be connected to the first network node 111, a baseband component of the first network node 111 may decide whether to configure the antenna array 124 of the first network node 111 to switch to a charging mode of some beams in order to be able to charge the coming wireless device 130. This Action 302 may be triggered by the receipt of the first indication in Action 301.

The mode of operation may be understood to be a particular way to use the one or more beamforming beams 121 so that wireless charging is enabled in the charging mode, or not in the non-charging mode or regular mode, which may be considered as a default mode. The determining in this Action 302 may be also considered to comprise, as an example, activating or not the charging mode, so that when the charging mode is not activated, the non-charging mode may be considered to be implicitly selected.

Determining may be understood as calculating, deriving, selecting, or similar. The determining in this Action 302 may be performed by a baseband unit in the first network node 111. The determining in this Action 302 may be based on a charging demand of the wireless device 130, a battery capacity of the wireless device 130, which may for example have been indicated in the first indication received in Action 301. The determining in this Action 302 may additionally or alternatively be based on resources available at the first network node 111, which may be understood to be based on e.g., load at the first network node 111, priority of the other users at the first network node 111 in comparison with a priority of the wireless device 130, etc. . . . . . For example, if the first network node 111 is in an area of high traffic, and the load is very high, it may decline to charge the wireless device 130, which may then need to try to be charged in another site, e.g., the next site along its route 150. The determining in this Action 302 may also be based on the distance to the next site, e.g., along the route 150 to the destination 160. If the next site is far away, the distance for charging the wireless device 130 may be understood to also be far away. This may be understood to mean that the charging of the wireless device 130, may need to be performed in its current location before going to next one, based on e.g., RPC.

Action 303

The beam power delivery may vary with the distance between a radio antenna of the first network node 111 and the position of the wireless device 130. If the wireless device 130 is far away, several beams may need to transfer the same amount of power in relation to distance. Also, depending on the power demand of the wireless device 130, several multi beams may be activated to support the wireless device 130 with power. Accordingly, in this Action 303, the first network node 111 may allocate the one or more beamforming beams 121 to charge the wireless device 130.

The allocating in this Action 303 may be understood to be performed by, e.g., the baseband unit in the first network node 111. The allocating in this Action 303 may be based on an energy demand from the wireless device 130. If the energy on the wireless device 130 is low, e.g., the battery capacity is low based on a certain level, the wireless device 130 may be understood to need more beams to be allocated. The beamforming beams may be selected, 1,2,3,4 etc, based on the level of the battery capacity, and the fast charging that may be needed considering e.g., the distance toward the next network node along the route 150, e.g., based on RPC.

The allocation, or reallocation, of the number of antenna beams may be prepared in advance, e.g., based on a route determined to be followed by the wireless device 130, as will be described later, and pre-allocated, for example, via a network slice.

Action 304

In some embodiments, the first network node 111 may have determined, in Action 302, that the mode of operation is to be the charging mode. In embodiments herein, following the principle described earlier in relation to FIG. 1, transmission of power may be accomplished by using a beam forming antenna 124 in the first network node 111 as a transmitter by performing matching and to generate the oscillation that may be needed.

In existing systems, the arrangement of beams does not support effective wireless charging of a user equipment such as a drone or an IoT device. In order to overcome this, in some embodiments herein, the first network node 111 may rearrange the one or more beamforming beams 121, in order to support Wireless Power Transfer (WPT) to the wireless device 130. Accordingly, in this Action 304, the first network node 111 may determine a pattern of arrangement of the one or more beamforming beams 121. In other words, the first network node 111 may rearrange several beams of the one or more beamforming beams 121 in a certain pattern to wirelessly charge the wireless device 130. The arrangement may be understood to set the amount of power transferred, and matching to the wireless device 130, such that, in the determined pattern of arrangement the energy pulses may be transmitted to the wireless device 130, and charge it effectively.

The determining in this Action 302 may be performed in order to create the oscillator that may be needed, to be able to transmit power to the receiver, matching, of the wireless device 130, following the principle described earlier in relation to FIG. 1. The determining in this Action 302 may therefore be performed based on a capacity of a battery in the wireless device 130.

The pattern of arrangement may be understood to be a manner in which the different beams of the one or more beamforming beams 121, which may have been allocated in Action 303, may transmit energy with respect to each other.

In some examples, the pattern of arrangement may be a Pulse Width Modulation (PWM) arrangement. Such a pattern of arrangement may enable to use all energy content in the one or more beamforming beams 121 to charge the wireless device 130. Different patterns of arrangement be able to charge the wireless device 130 with different speeds, and to enable different charging capacity towards the wireless device 130. The pattern of arrangement may be synchronous, or asynchronous.

The synchronous pattern of arrangement, which may be also referred to as a synchronous mode, may be understood to be a pattern of arrangement whereby the one or more beamforming beams 121 may be synchronized, to charge the one or more beamforming beams 121 faster, and may focus multiple beams in one direction. The synchronous pattern of arrangement may enable to create a peak power and enable faster charging.

The asynchronous pattern of arrangement, which may be also referred to as an asynchronous mode, may be understood to be a pattern of arrangement whereby the one or more beamforming beams 121 may not be synchronized for charging the wireless device 130. The asynchronous pattern of arrangement may create a slower charging mode and result in lower noise on the wireless communications network 100.

Figure 4:
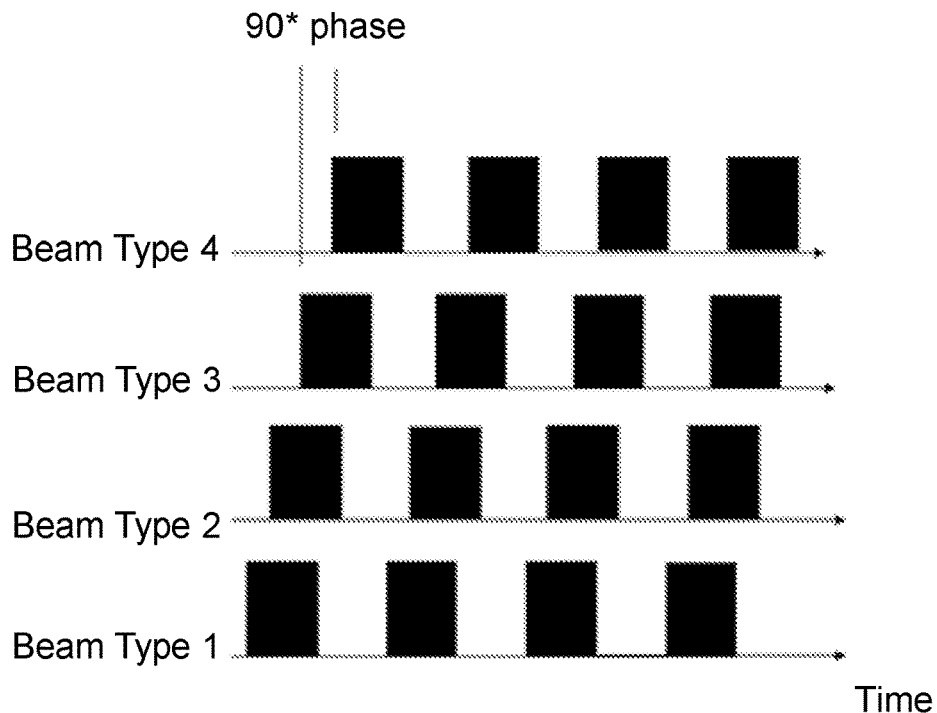
FIG. 4 is a schematic diagram illustrating an example of different Pulse Width Modulation (PWM) arrangements, according to embodiments herein.
Figure 4:
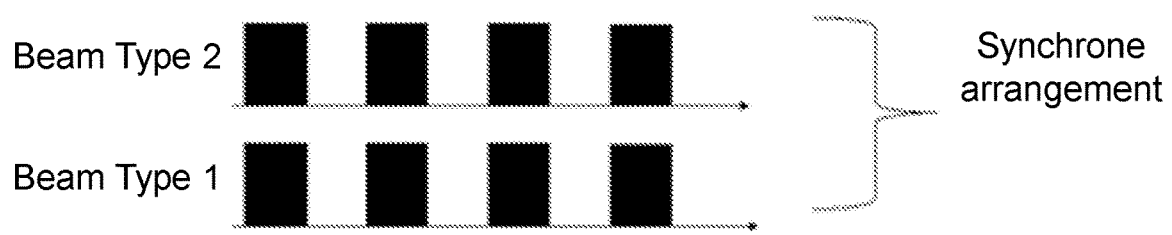
Figure 4:
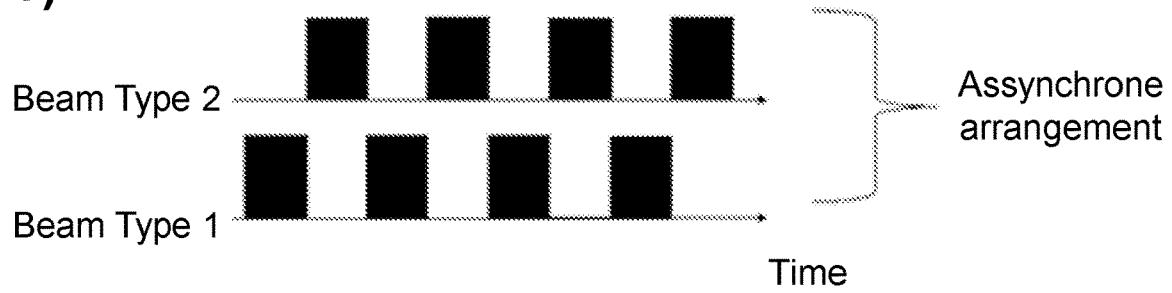

To illustrate some of these embodiments, reference is made to FIG. 4. FIG. 4 is a schematic representation of different PWM arrangements of the one or more beamforming beams 121 for WPT according to embodiments herein to further increase the output power of the beams: asynchronous, 90* phase shifted illustrated in panel a), synchronous illustrated in panel b), and asynchronous illustrated in panel c). In FIG. 4, each black rectangle represents a pulse transmission from one of the one or more beamforming beams 121. According to the 90* phase shifted pattern of arrangement, the one or more beamforming beams 121, may comprise different types of beamforming beams, four in the illustrated example, each transmitting in time with a 90* phase shift with respect to each other. According to the asynchronous pattern of arrangement, the one or more beamforming beams 121, may comprise different types of beamforming beams, two in the illustrated example, each transmitting when the other type is not transmitting, and therefore, asynchronously with respect to each other. According to the synchronous pattern of arrangement, the one or more beamforming beams 121, may all, independently of the type of beamforming beams, two in the illustrated example, each transmit at the same time, synchronously with respect to each other.

Selection of synchronous or asynchronous pattern of arrangement may be set, for different beams of the one or more beamforming beams 121. Adding more beams to charge the wireless device 130, may be understood to enable to charge the wireless device 130 battery much faster.

It may be understood that both of the first network node 111, as transmitter, and the wireless device 130, as receiver may need matching. That is, in some embodiments, the pattern may be determined so to match a frequency and an impedance of a receiver of the one or more beamforming beams 121 in the wireless device 130. This may be performed according to this Action 304, and according to e.g., the examples in FIG. 4. This determination may be understood to enable energy transfer. The receiver may be understood to be in the wireless device 130.

Figure 5:
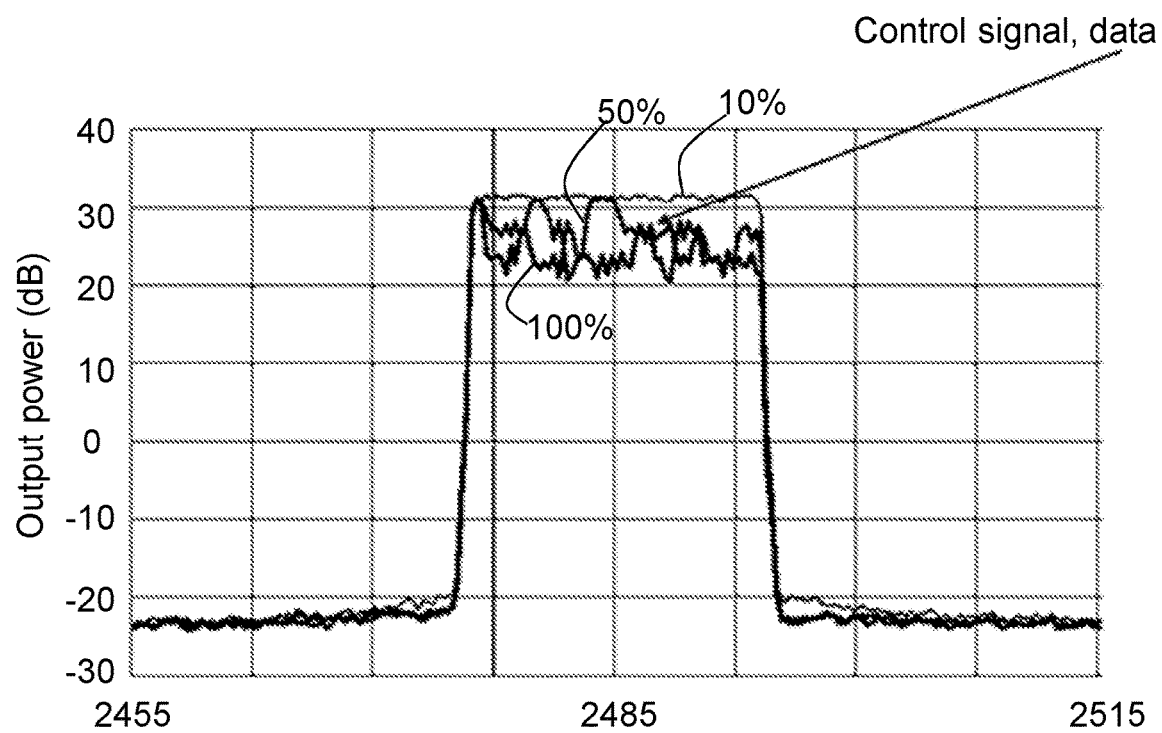
FIG. 5 is a schematic diagram illustrating an example of spectral power variation and symbols inside a beam, according to embodiments herein.

In some examples, the matching information between the first network node 111, as transmitter, and the wireless device 130, as receiver, may be correlated and the information may be "housed" inside at least one of the one or more beamforming beams 121 as control signals. The wireless device 130 may be moving on the flight, and the movement of the beam antennas and the wireless device 130 may need to be correlated, to match the beam and the beam point of direction. When the wireless device 130 may be moving, the baseband unit in the first network node 111, via a beamforming manager, may need also to change direction of the beam. A non-limiting example of this is depicted in FIG. 5. FIG. 5 is a graphical representation of the output power in dB of a beamformed beam, with a spectral power variation between 10%-100%, as indicated. The variation may be caused by reference signals, or data signals to the wireless device 130. The control signal and matching symbols may be transmitted dynamically via the control signal, that is, symbols that that may be scheduled, inside the beam, along with data, as indicated. The control signal may then be received by the wireless device 130, e.g., a drone, is the same manner as a UE.

Action 305

The beam power delivery may also vary with the distance between the radio antenna of the first network node 111 and the position of the wireless device 130. In this Action 305, the first network node 111 may determine a power of transmission of the one or more beamforming beams 121 based on a distance between the antenna array 124 transmitting the one or more beamforming beams 121 and the wireless device 130.

The power of transmission may be understood to be for one beam, and it may also be for several beams allocated, to charge the wireless device 130. That may be understood to be determined by what the need of charging the wireless device 130 battery may be.

That the power of transmission may be determined based on the distance between the antenna array 124 transmitting the one or more beamforming beams 121 and the wireless device 130 may be understood to mean that for same battery capacity, more beams may be allocated for charging, if the wireless device 130 is far away from the first network node 111, versus if the wireless device 130 is close to the first network node 111. The transmitted energy from the one or more beamforming beams 121 may be understood to be determined by the distance to the wireless device 130. Close to the first network node 111, the charging may be understood to be faster.

In some embodiments, an amount of power demand may be transferred via a control signal, first from the wireless device 130 to the first network node 111, and later accepted by the first network node 111. The transmission signal may be understood to have a reciprocal approach. One device may be understood to be sending and the other may be understood to need to accept it, to enable a transmission. The amount of power demand may be understood to be that which may be needed by the wireless device 130. The amount of power demand may have, for example, been indicated by the wireless device 130 together with, or separately from, the first indication. In some of these embodiments, the control signal may be transmitted inside the one or more beamforming beams 121 used to charge the wireless device 130, as depicted in FIG. 5. The control signal, e.g., indicating the amount of power demand needed, may be transmitted from the wireless device 130 to the first network node 111 via the control signal inside the beam, along with data, as indicated.

In some other of these embodiments, the control signal may be transmitted separately from the one or more beamforming beams 121 used to charge the wireless device 130.

Action 306

In this Action 306, the first network node 111 may determine at least one of a polarization and a matching.

The polarization may be understood to be of the antennas in the antenna array 124, and may be understood to refer to the path that may be traced by a tip of the electric field vector associated with an antenna as a function of time. The polarization of the antennas may be understood to determine the propagation of the beamforming beams. The polarization may be e.g., vertical and horizontal or both.

The matching may be understood to be setting the frequency, impedance and polarisation of the antennas e.g., in the antenna array 124.

By determining the polarization and/or the matching in this Action 306, the energy transmission may be enabled, thereafter.

Action 307

The first network node 111, in this Action 307, modulates the one or more beamforming beams 121 in an antenna array 124 controlled by the first network node 111 with a pulse width modulation (PWM). The pulse width modulation may be understood as a signal determining the turn ON/OFF time of the pulses of the one or more beamforming beams 121, and may be understood to charge the wireless device 130, based on the wireless device 130 distance from first network node 111. A wider beam pulse, may be understood to give more charge to the wireless device 130, compared to a short pulse. PWM may be understood to determine the ON time of the pulse.

Figure 6:
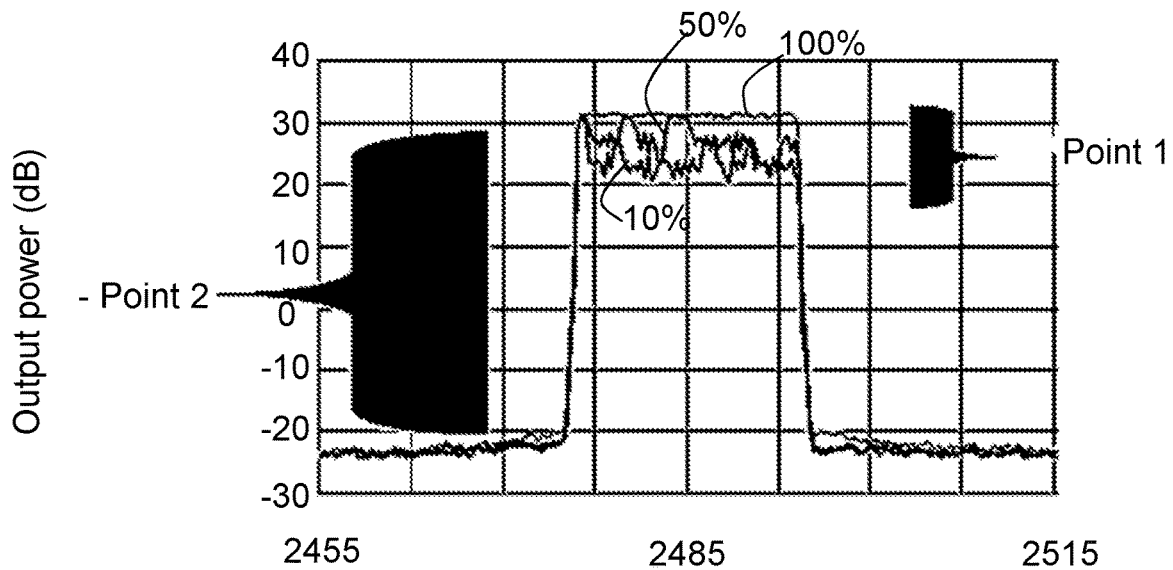
FIG. 6 is a schematic diagram illustrating an example of current beam in a radio unit, according to embodiments herein.

As mentioned earlier, in existing systems, a radio unit of a beam forming manager (BFM) does not support effective wireless charging of a drone or other IoT device. To illustrate this, reference is made to FIG. 6. FIG. 6 is a graphical representation of real measurements of the output power in dB of a beamformed beam. In existing methods, beamformed beams are showered, which may be understood as being characterized by a small signal variation, see point 1 in FIG. 6. As it may be appreciated in point 1 of FIG. 6, the variation in the output power of traffic, data and reference signal between 10%-100% of the depicted beam, measured as the peak-to average power ratio (PAPR), is small. This means that the power variation is too small to be able to be used to power transfer. According to some embodiments herein, this may be overcome by turning "ON" and "OFF" the beamformed beam. By turning ON/OFF the different beams of the one or more beamforming beams 121, it may be understood that the respective transmitter may be put to sleep mode, or idle mode, intermittently. As seen in point 2 in FIG. 6, by turning "ON" and "OFF" the beamformed beam, the power variation may be increased in respect to dB variation, and more power may be gained out of the beamformed beam, compared to point 1. In accordance with this, in order to further increase the output power of the one or more beamforming beams 121, the modulating in this Action 307 may comprise turning on and off each of the one or more beamforming beams 121 with a pulse width modulation sequence.

In some of the embodiments wherein the first network node 111 may have received the first indication according to Action 301, the modulating 307 may be performed based on the received first indication. That is, the modulating 307 may be triggered or prompted by the received first indication.

In some of the embodiments wherein the first network node 111 may have determined the mode of operation according to Action 302, the modulating 307 may be performed with the one or more beamforming beams 121, according to the determined mode of operation In some of the embodiments wherein the first network node 111 may have allocated the one or more beamforming beams 121 according to Action 303, the modulating in this Action 307 may be performed with the allocated one or more beamforming beams 121.

In some of the embodiments wherein the first network node 111 may have determined the pattern of arrangement according to Action 304, the modulating in this Action 307 may be performed with the determined pattern of arrangement.

In some of the embodiments wherein the first network node 111 may have determined at least one of the polarization and the matching according to Action 306, the modulating in this Action 307 may be performed with the determined polarization and matching.

Action 308

In this Action 308, the first network node 111, charges, wirelessly, the wireless device 130, with the modulated one or more beamforming beams 121.

In some of the embodiments wherein the first network node 111 may have determined the power of transmission according to Action 305, the charging in this Action 308 may be performed based on the determined power of transmission.

In some of the embodiments wherein the first network node 111 may have adapted the determined pattern according to Action 306, the charging in this Action 308 may be performed with the adapted pattern.

In some of the embodiments wherein the first network node 111 may have determined the pattern according to Action 304, the charging in this Action 308 may be performed with the one or more beamforming beams 121 arranged with the determined pattern.

In addition to the use case of the wireless device 130 as an FSO drone, which has already been described, embodiments herein may be used for other applications, such as the use case when the wireless device 130 may be an IoT device within the coverage of the first cell 126, and/or the beam forming range that may be used within the first cell 126. IoT devices may be understood to not require large power in comparison to a drone. In such cases, it may be relevant to perform the charging in this Action 308 when the wireless device 130 may be active, and not in sleep mode. Some IoT devices may sleep for long periods, which may span from one day to one month. Also relevant for this use case may be to perform the charging in this Action 308 with a direct power transfer, without any obstacles in between. In such cases the charging in this Action 308 may need to be increased with multiple beams towards the wireless device 130 or other IoT devices.

In another use case, the wireless device 130 may be a Customer Premises Equipment (CPE), such as a WiFi equipment used internally in a building. In such cases, the wireless device 130 may need to be in close proximity to a window, so that the power transfer in such cases may be used to support some power to the Wifi equipment.

Action 309

According to embodiments herein, the charging of Action 308 may be performed while the wireless device 130 is in static position, but also during its continued operation. If the wireless device 130 changes position and/or location, the first network node 111 may need to adapt the matching, e.g., the change in PWM, frequency, impedance, or polarization, to improve the energy transfer in accordance with any requirements the one or more beamforming beams 121 may have to continue the matching to be able to charge the battery.

In accordance with this, in this Action 309, the first network node 111 may adapt the determined pattern in Action 304 based on a mobility of the wireless device 130 in the wireless communications network 100. The adapting in this Action 309 may be understood to be to increase the energy transfer during the charging of the wireless device 130. The adapting in this Action 309 may therefore comprise making reallocations of beam patterns, and beam matching, e.g., of frequency, impedance, and/or polarization re-arranging the determined pattern so to match the correct frequency of the receiver on the wireless device 13. This may be performed, for example by turning ON and/or OFF the beams in other frequencies.

Action 310

The first network node 111 may, in this Action 310, receive a second indication from the wireless device 130 signalling the end of the charging session. This may be performed once the charging in Action 308 of the wireless device 130 may have been completed. Alternatively, it may be possible for the first network node 111 to sense when the wireless device 130 may be sufficiently charged, or when it may be out of signal strength, to make a handover to another network node.

In this Action 310, the receiving may be implemented, e.g., via the one or more beamforming beams 121.

Figure 7:
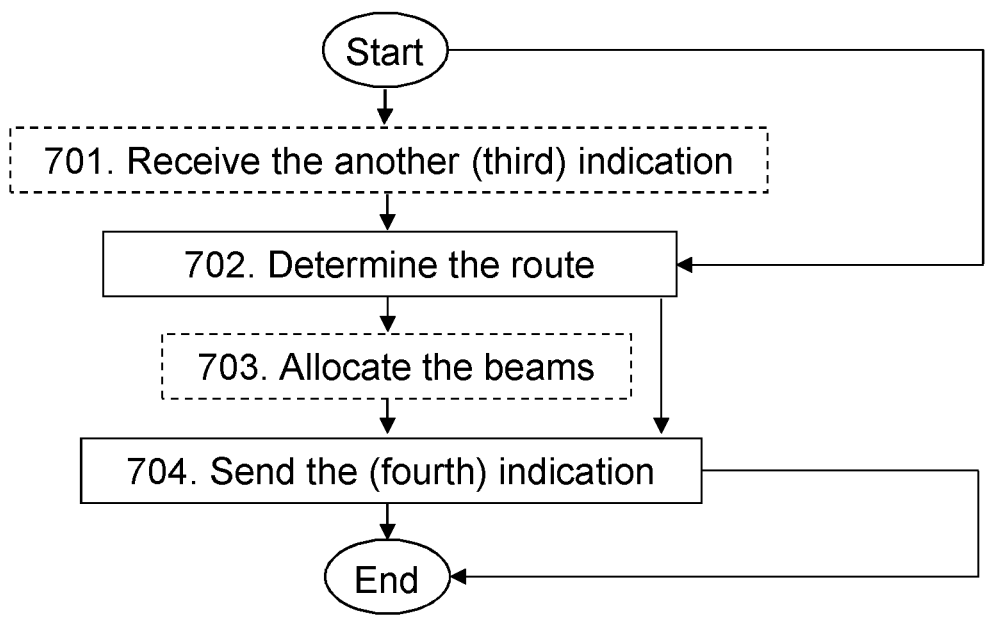
FIG. 7 is a flowchart depicting a method in a second node, according to embodiments herein.

Embodiments of a method performed by the second node 102, will now be described with reference to the flowchart depicted in FIG. 7. The method is for handling the charging of the wireless device 130. The second node 102 and the wireless device 130 operate in the wireless communications network 100. In these embodiments herein, the wireless device 130 is the UAV 131.

The method may comprise the following actions. Several embodiments are comprised herein. In some embodiments, some actions may be performed, in other embodiments, all actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 7, optional actions are represented in boxes with dashed lines.

The detailed description of some of the following corresponds to the same references provided above, in relation to the actions described for the first network node 111, and will thus not be repeated here to simplify the description. For example, the allocation, or reallocation, of the number of antenna beams may be prepared in advance and pre-allocated, for example, via a network slice.

Action 701

In this Action 701, the second node 102 may receive another indication, e.g., a third indication, from the UAV 131. The another indication may indicate a destination 160 of the UAV 131. The destination may be understood to be a geographical destination.

The receiving in this Action 701 may be performed e.g., via the second link 142. The second node 102 may receive the third indication once the wireless device 130 may be connected.

Action 702

In this Action 702, the second node 102 determines a route 150 to be followed by the UAV 131 to reach the destination 160. The route may be planned across the cells in the wireless communications network 100.

The determining in this Action 702 is based on at least one of the following options. In a first option, the determining may be based on a possibility of charging a battery of the UAV 131 via the beamforming beams 121, 122, 123 transmitted by the one or more first network nodes 110 operating in the wireless communications network 100 along the route 150. In a second option, the determining may be based on an estimated amount of energy needed by the UAV 131 along the route 150. In a third option, the determining may be based on an estimated amount of available energy in the UAV 131 along the route 150.

Determining may be understood as e.g., calculating, estimating, or deriving.

In some examples, the second node 102 may use an A* algorithm to search the best travelling route, including the best beam power travel, route for the wireless device 130 throughout the coverage area, from a current location of the wireless device 130, to the destination 160. Other optional implementations may comprise using a Dijkstra, bellman-ford algorithm or reinforcement learning approaches.

Figure 8:
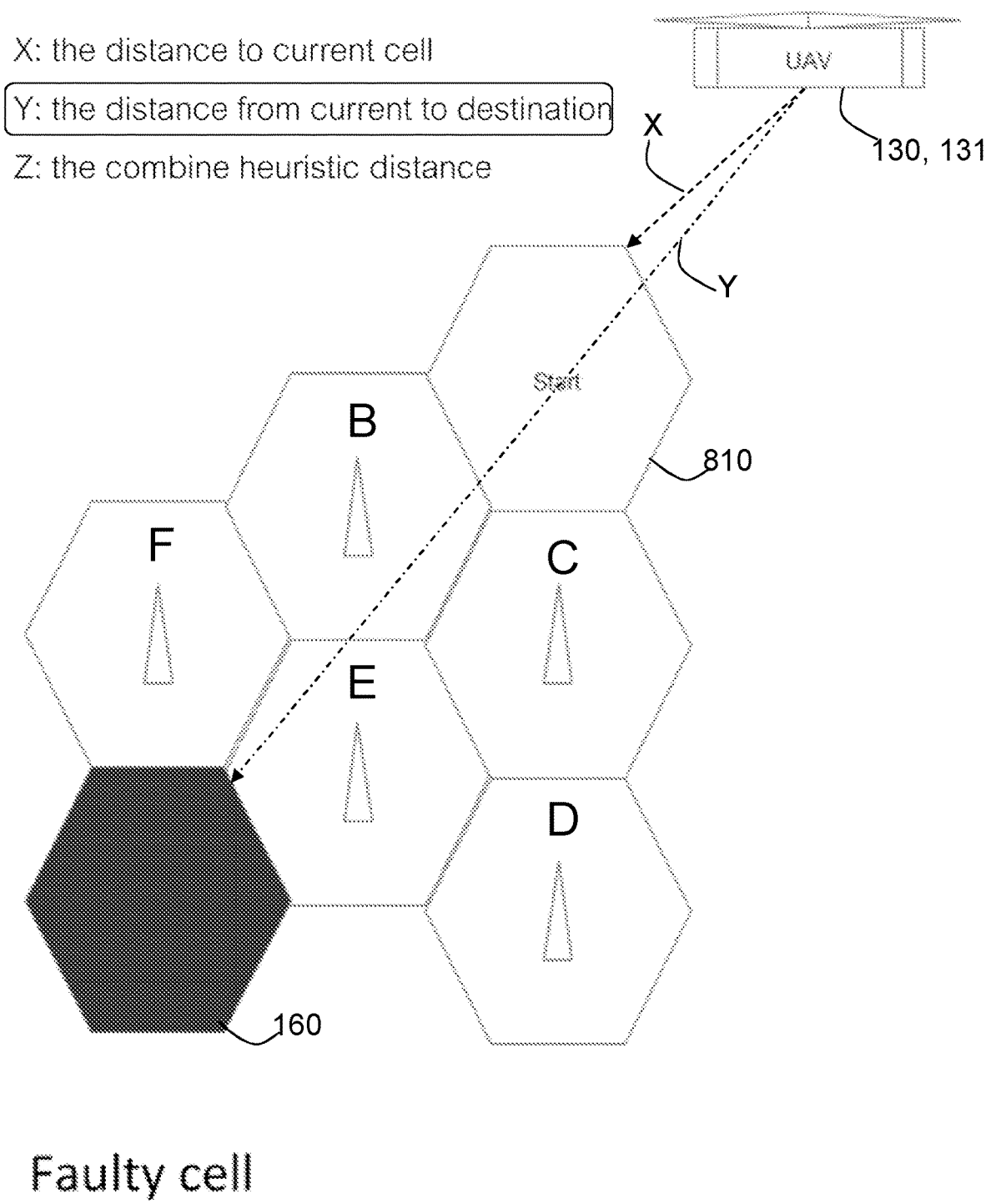
FIG. 8 is a schematic diagram illustrating an example of route planning across the coverage of sites, according to embodiments herein.

For example, in a problem description for the A* algorithm, the second node 102 may require that both, a) the wireless device 130 fly using the shortest path, and b) charging take place at the best position where the battery may be low. The "best charging position" may be defined to be the site with the least combined heuristic distance. The heuristic distance may be understood as the distance from the current location of the UAV 131 to its next visiting site+the distance from the next visiting site to the final destination, here, the faulty cell. According to the above definition, the charging place in the middle of the traveling route may be determined, making it less likely to schedule a site in the opposite direction to charge up the UAV 131, as well as visiting as many sites as possible during the flight. To assist in explaining the determination in this Action 702, reference is made to FIG. 8. FIG. 8 is a schematic representation of how the second node 102 may plan the route 150 from a start site 810, to a destination 160, in this example, a faulty cell in the wireless communications network 100 that needs to be repaired, across the coverage of different sites B, C, D, E, and F, which may be understood to be served by the one or more first network nodes 110. Indicated in FIG. 8 are the distance "X" from the from the current location of the UAV 131 to the current cell serving the wireless device 130, that is, the start site 810, the distance "Y" from the from the current location of the UAV 131 to the destination 160, and the combined heuristic distance "Z", that is, the distance from the current location of the UAV 131 to its next visiting site, for example, cell B, + the distance from the next visiting site, for example cell B, to the final destination 160, here, the faulty cell.

Figure 9:
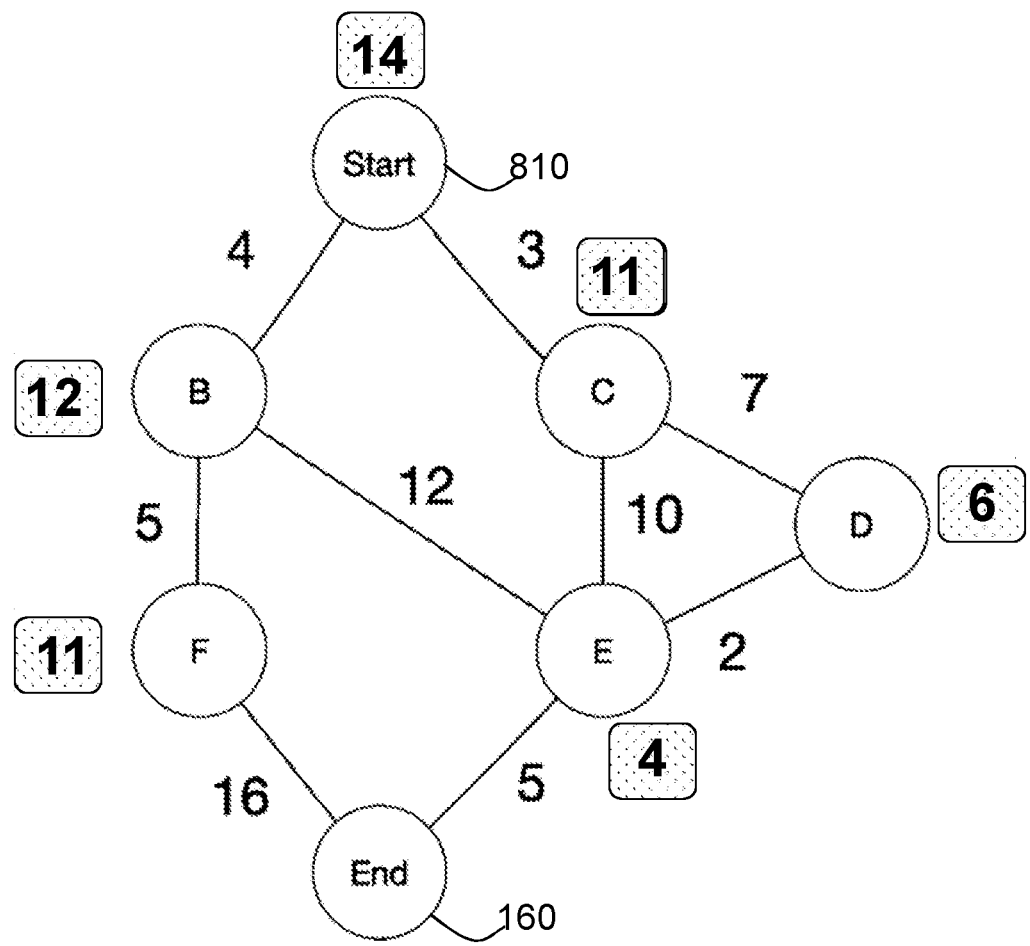
FIG. 9 is a schematic diagram illustrating an example of an abstraction of the route between sites, according to embodiments herein.

By adding more distance information between the depicted cells B, C, D, E, and F, FIG. 8 may be abstracted into FIG. 9. Represented in FIG. 9 are the start site 810 and the destination 160, as well as the different sites B, C, D, E, and F in between. X, Y, Z correspond to the same definition provided in FIG. 8. Based on the Dijkstra algorithm, the second node 102 may use the A* algorithm to select the least heuristic distanced route between the start site 810 and the destination 160. The heuristic distance may be defined as a route cost, as indicated by the numbers without any frame, and the estimated route cost from a certain node to the destination 160, as indicated by the framed numbers in dotted backgrounds. The "route cost" may be understood to refer to "a distance from the current location of the UAV 131 to its next visiting site". The "estimated route cost" may be understood as "the distance from the next visiting site to the final destination", here, the faulty cell. In context of this disclosure, cost of a network link may be understood as one or a combination of: a geographical distance between two sites, a relative elevation of the two sites, and/or a line-of-sight. For example, if an X2 interface between two first network nodes is over millimeter wave, there may be understood to be direct line of sight, which may be understood to mean that the wireless device 130 may fly in a straight line, as opposed to fiber, which may mean that the wireless device 130 may need to go around obstacles. As an example, B's heuristic distance is 16=4+12. Under this approach, the UAC 131 will go to C rather than B in this case because, the heuristic distance from the start site 810 to the destination 160 going to B is larger than going to C. Thus, C is the next hoop. In the event that the wireless device 130 may not be able to travel for a distance of more than 10 e.g., km due to battery limitation, the second node 102, in this non-limiting example, may not attempt to search through any route cost more than 10 e.g., km, due to the battery constrain of the wireless device 130. After searching through the A* algorithm, the second node 102, may be able to determine, according to this Action 702, the best route to be Start>C>D>E>End, where D is the "Charging site".

In some embodiments, at least the first network node 111 of the one or more first network nodes 110 may be capable of modulating the one or more beamforming beams 121 in an antenna array 124 controlled by the first network node 111 with the pulse width modulation. The first network node 111 may be capable of charging, wirelessly, the UAV 131, with the modulated one or more beamforming beams 121.

In some of such embodiments, the determining in this Action 702 may be based on the capability of the first network node 111, that is, the capability of modulating the one or more beamforming beams 121 with the pulse width modulation and to wirelessly charge the UAV 131, with the modulated one or more beamforming beams 121.

In some embodiments, the determined route 150 may be based on the received another indication. That is, the determined route 150 may be based on the destination 160 indicated by the third indication.

The second node 102 may be deployed on the cloud 125 to have the whole overview of the topology of the possible route 150, and send the whole route 150 of the trip to the wireless device 130. Otherwise, the second node 102 may be deployed on the site and just provide the wireless device 130 with information on the "next hop".

The second node 102 may be understood to need to be aware of any immediate neighbours of a node, and the "cost" of traversing a network link. In the distributed case described in the previous paragraph, the X2 application protocol (X2AP) may be used to relay network cost information in addition to a neighbor discovery table. In some examples, the second node 102 may communicate with neighboring first network nodes of the one or more first network nodes 110, in order to perform handover for the connected UAV 131 throughout a given cell. In the centralized case, the second node 102, as the second network node 112, may be part of the MME, in LTE, or an AMF node in 5G, which may be understood to be aware of the topology of the wireless communications network 100, or may be a standalone node.

Action 703

In this Action 703, the second node 102 may allocate one or more of the beamforming beams 121, 122, 123 in the determined route 150 to charge the UAV 131. The allocated beamforming beams 121, 122, 123 may be understood as "charging beams" allocated in advance for a current site where the wireless device 130 may be, e.g., next to the first network node 111, and any next coming RBS sites. The planning of the route 150 determined in Action 702 may then incorporate the allocation on RAN level for specific site or multi sites in order to schedule the charging beams.

Action 704

The second node 102, in this Action 704, sends an indication, e.g., a fourth indication, to the UAV 131. The fourth indication indicates the determined route 150.

The sending in this Action 704 may be implemented, e.g., via the second link 142.

Figure 10:
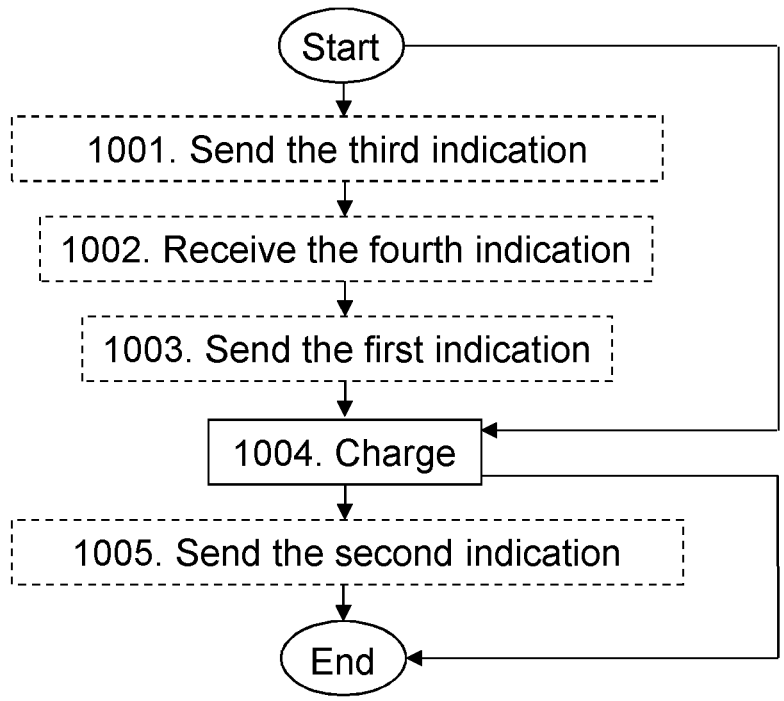
FIG. 10 is a flowchart depicting a method in a wireless device, according to embodiments herein.

Embodiments of a method performed by a wireless device 130 comprised in the wireless device 130, will now be described with reference to the flowchart depicted in FIG. 10. The method is for handling the charging of the wireless device 130 by the first network node 111. The first network node 111 and the wireless device 130 operate in the wireless communications network 100.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 10, optional actions are represented in boxes with dashed lines.

The detailed description of some of the following corresponds to the same references provided above, in relation to the actions described for the first network node 111, and will thus not be repeated here to simplify the description. For example, the wireless device 130 may be an FSO drone, an IoT device or a CPE, such as a WiFi equipment used internally in a building.

Action 1001

In some embodiments, the wireless device 130 may be the UAV 131. In some of these embodiments, the wireless device 130 may, in this Action 1001, send the third indication to the second node 102 operating in the wireless communications network 100. The third indication may indicate the destination 160 of the UAV 131.

The sending in this Action 1001 may be performed e.g., via the second link 142.

Action 1002

In this Action 1002, the wireless device 130 may receive, based on the sent third indication, the fourth indication from the second node 102. As described earlier, the fourth indication may indicate the route 150 to be followed by the UAV 131 to reach the destination 160. The indication may be based on at least one of: i) the possibility of charging the battery of the UAV 131 via the beamforming beams 121, 122, 123 transmitted by the one or more first network nodes 110 operating in the wireless communications network 100 along the route 150, ii) the estimated amount of energy needed by the UAV 131 along the route 150, and iii) the estimated amount of available energy in the UAV 131 along the route 150. The first network node 111 may be comprised in the route 150.

The receiving in this Action 1002 may be performed e.g., via the second link 142.

Action 1003

The route 150 may comprise the first network node 111 as one of the network nodes to visit to reach the destination 160, and where the wireless device 130 may charge its battery. In this Action 1003, the wireless device 130 may send, to the first network node 111, the first indication requesting the start of the charging session.

The sending in this Action 1003 may be performed e.g., via the first link 141.

Action 1004

In this Action 1004, the wireless device 130 charges, wirelessly, by receiving, from the first network node 111, the one or more beamforming beams 121 modulated with the pulse width modulation. The charging may be performed as described in Action 308 above.

In some embodiments, the charging in this Action 1004 may be performed based on the sent first indication. For example, the charging in this Action 1004 may be triggered after the first indication, and/or the charging in this Action 1004 may be performed for the amount of power demand indicated by the wireless device 130 in the first indication.

As described earlier, the amount of power demand may be transferred via the control signal. The control signal may be one of: a) received inside the one or more beamforming beams 121 used to charge the wireless device 130, and b) received separately from the one or more beamforming beams 121 used to charge the wireless device 130.

Action 1005

In this Action 1005, the wireless device 130 may send the second indication to the first network node 111 signalling the end of the charging session, once the charging in Action 1004 of the wireless device 130 may have been completed.

The sending in this Action 1005 may be implemented, for example, via the first link 141. After sending the second indication, the wireless device 130 may then continue its route 150 along the other first network nodes of the one or more first network nodes 110, and depending on its power demand, repeat the procedure of FIG. 10 in other first network nodes until it may reach its destination 160.

Figure 11:
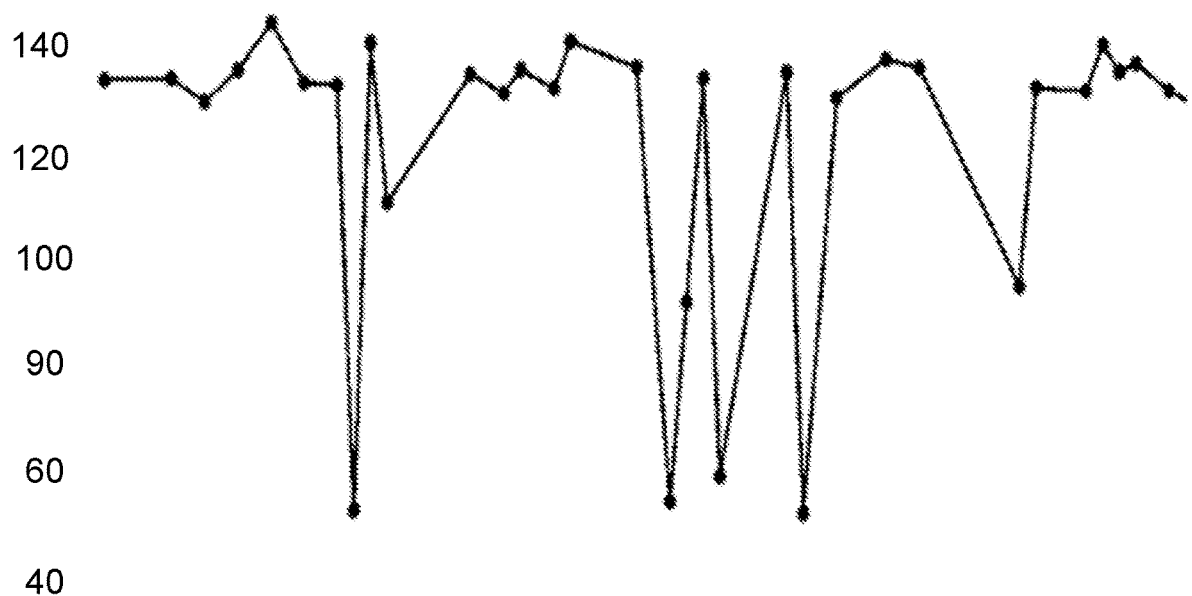
FIG. 11 is a schematic diagram illustrating an example of power variation state variation, according to embodiments herein.

FIG. 11 is a graphical representation of power state variation for a beamforming beam, such as any of the one or more beamforming beams 121. In the graph, the horizontal axis represents power in dB and the vertical axis represents time. As may be appreciated from the figure, turning the one or more beamforming beams ON/OFF according to embodiments herein does not affect the spectrum carrier frequencies according to 3GPP. By turning ON/OFF the beams in a PWM manner, a new frequency pattern may be generated, based on PWM. FIG. 11 shows that different frequencies may be created based on the different sleep modes, that exist already, but not in controlled way. The different sleep modes may be randomly generated. This new PWM frequency pattern may be understood to not have an impact on the spectrum frequency, as defined by 3GPP organisation.

Figure 12:
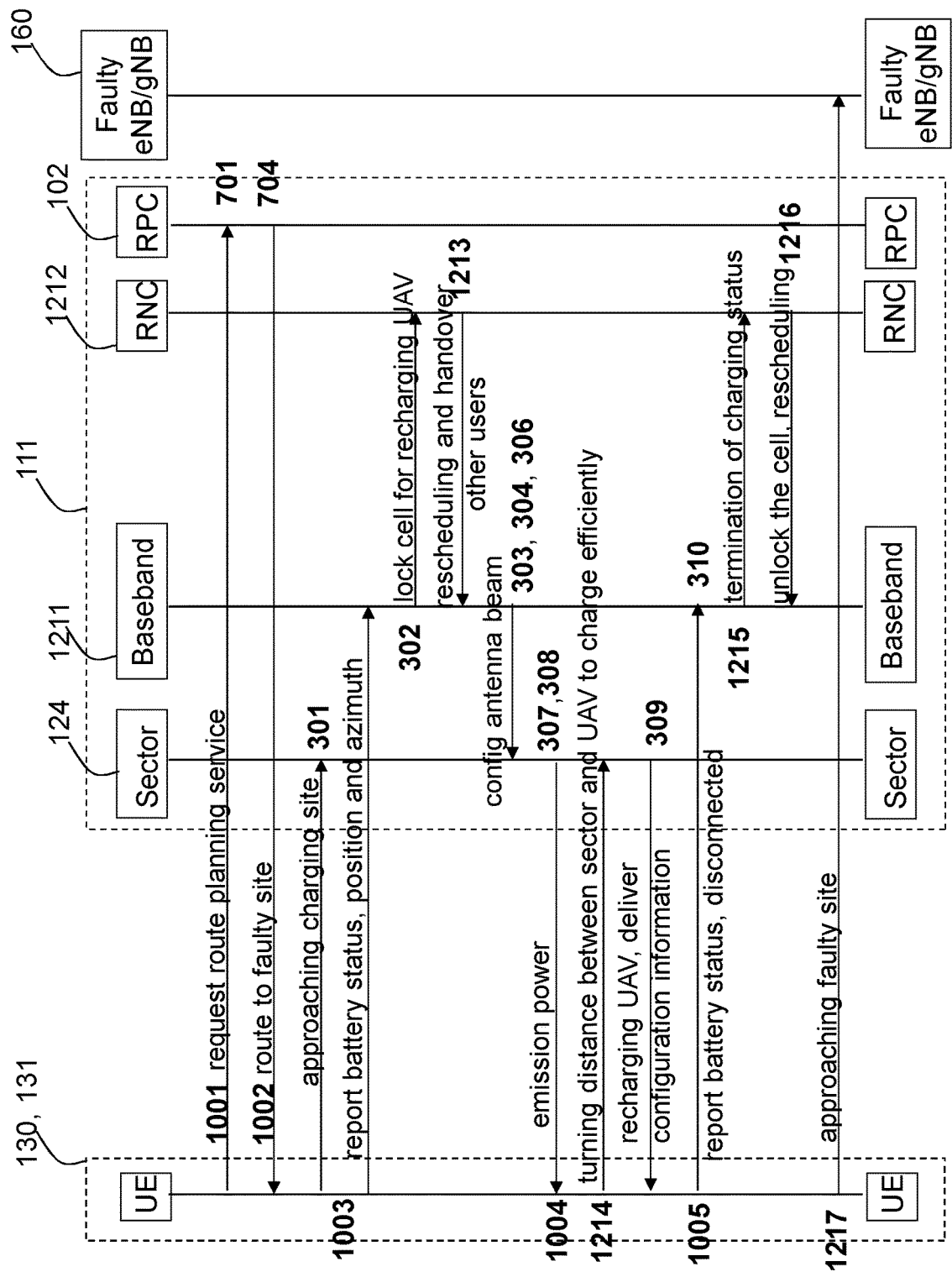
FIG. 12 is a signalling diagram illustrating an example of methods according to embodiments herein.

FIG. 12 is a schematic representation the actions that the first network node 111, the second node 102 and the wireless device 130 may perform, according to a non-limiting example of embodiments herein. In this particular non-limiting example the second node 102 is the second network node 112, and the first network node 111 and the second node 102, are co-localized in a same radio network node. The wireless device 130 in this example is the UAV 131, trying to reach the destination 160, which is a faulty eNB/gNB. According to Action 1001, the UAV 131 sends the third indication to the second node 102, indicating the destination 160 and requesting a route planning service to reach it. The second node 102 receives the third indication according to Action 701, and sends the fourth indication to the UAV 131, indicating the determined route 150 to the faulty site according to Action 704. According to Action 1002, the UAV 131 receives the fourth indication. According to Action 1003, the UAV 131 then sends the first indication to the first network node 111 indicating, in this example, that it is approaching the charging site, and requesting the start of a charging session. The antenna array 124, labelled as "sector" in FIG. 12, in the first network node 111 receives the first indication according to Action 301. Also, as part of the first indication in Action 1003, the UAV 131 may report a battery status, its position and azimuth to a baseband component 1211 in the first network node 111. The baseband component 1211 determines, in accordance with Action 302, that the mode of operation is the charging mode, and instructs an RNC 1212 in the first network node 111 to lock the first cell 126 for recharging the battery of the UAV 131. The RNC 1212, at 1213, as part of Action 302, signals back to the baseband component 1211 to reschedule and handover other users, in order to implement the charging mode. The baseband component 1211, may then, in accordance with Action 303 allocate the one or more beamforming beams 121 to charge the wireless device 130, and, in accordance with Action 304, determine the pattern of arrangement of the one or more beamforming beams 121, signalling a configuration for the one or more beamforming beams 121 to the antenna array 124. The antenna array 124 may then, according to Action 307, modulate the one or more beamforming beams 121 and wirelessly charge the UAV 131, according to Action 308 on the first network node 111 side, and Action 1004 on the UAV 131 side. The charging occurs with the emission of power from the first network node 111. At 1214, the UAV 131 signals to the first network node 111, that it is changing position, by turning its distance between the sector and the UAV 131 in order to charge efficiently, e.g., as determined by a route planning component. The antenna array 124 in the first network node 111 then adapts, according to Action 309, the determined charging pattern, recharging the UAV 131 according to the adapted pattern, and delivering configuration information.

According to Action 1005, the UAV 131 then sends the second indication indicating, in this example, a new report of the battery status, and the end of the charging session, by indicating that it is disconnected from the first network node 111. The second indication is received by the baseband component 1211 according to Action 310. At 1215, the baseband component 1211 signals the termination of the charging status to the RNC 1212. At 1216, the RNC instructs the baseband component 1211 to unlock the first cell 126 and reschedule the other users, e.g., voice and data transmission. Finally, at 1217, after, if necessary, repeating a similar process with the other one or more first network nodes 110 in the route 150, the UAV 131 signals to the faulty eNB/gNB, the destination 160, that it is approaching.

Figure 13:
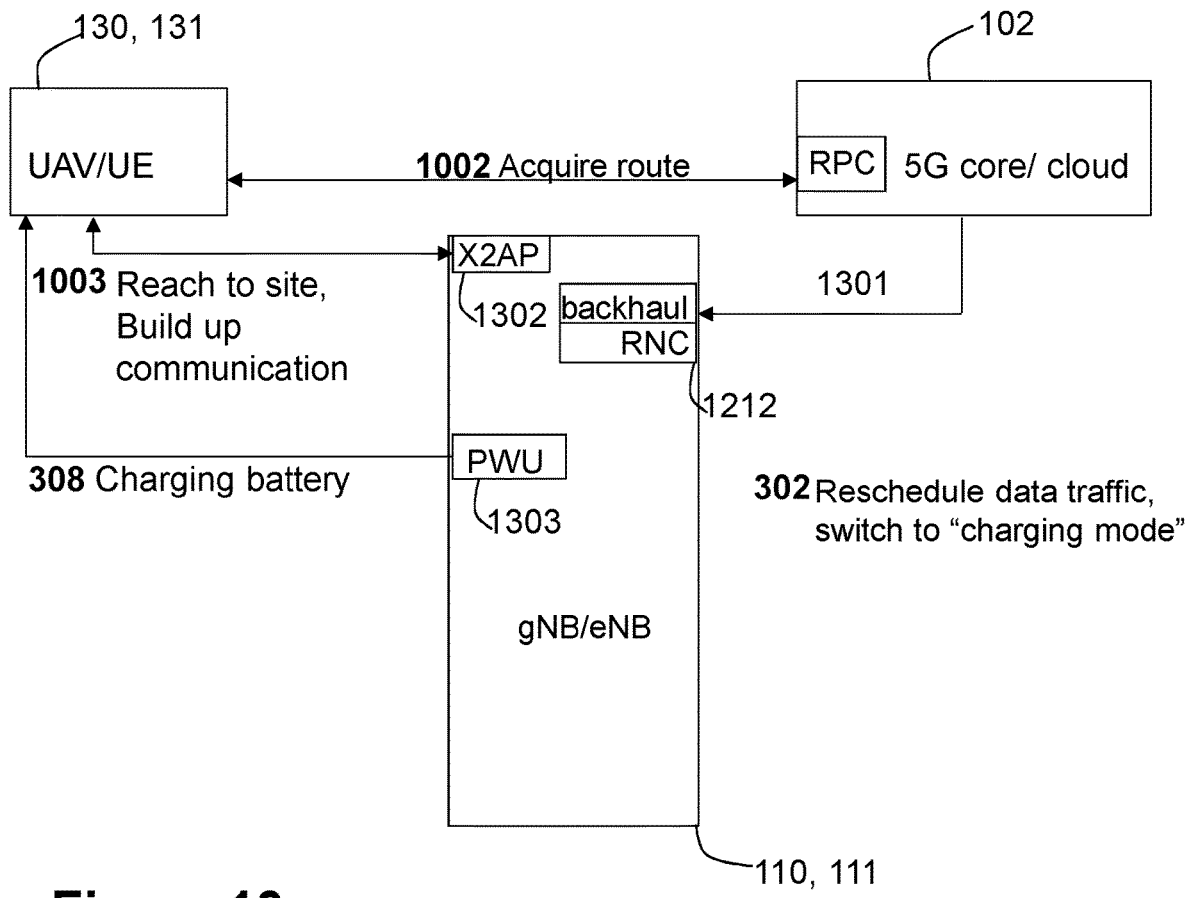
FIG. 13 is a schematic diagram illustrating an example of a cloud implementation of embodiments herein.

FIG. 13 is a schematic block representation illustrating a non-limiting example of a cloud implementation of embodiments herein, wherein the second node 102 is the second network node 112, and is an RPC deployed in the cloud 125, as part of the core network of the wireless communications network 100, the first network node 111 is a radio network node with combined gNB and eNB functionality, and the wireless device 130 is a UAV 131. As depicted in the Figure, the UAV 131 acquires the route 150 to be followed by the UAV 131 to reach the destination 160 by receiving the fourth indication from the second node 102, in accordance with Action 1002. The indicated route 150 comprises the first network node 111. In this example, the second node 102 also sends, at 1301, via a backhaul connection, a fifth indication to the RNC component 1212 in the first network node 111, indicating that the wireless device 130 is to be charged. The UAV 131 then reaches the site of the first network node 111, building up communication with an X2AP protocol unit 1302 used by the first network node 111, and requests the start of a charging session according to Action 1003. The first network node 111 determines that the mode of operation is the charging mode, in accordance with Action 302, and reschedules data traffic, and switches to the "charging mode". Then, in accordance with Action 308, the first network node 111, charges, wirelessly, the wireless device 130, with the modulated one or more beamforming beams 121, using a Power Width modulation Unit (PWU) 1303 in the first network node 111.

To summarize the foregoing, embodiments herein may be understood to be drawn to a method for beam allocation via a beamforming manager and within a radio site and/or multi sites. Other embodiments herein may be understood to be drawn to a method for the control of beams, single or multi beam activation, and managing of beams by using PWM control of beams by turning them ON/OFF for wireless charging of drones, or IoT devices. Further embodiments herein may be understood to be drawn to a PWM control of beam arrangement for wirelessly charging wireless power devices.

One advantage of embodiments herein is that they enable to provide an automated approach to use a wireless devices, such as a low-cost UAV, to perform long range site surveillance, without the need to increase its price and/or size or weight. A further advantage of embodiments herein is that they provide a way to have a site communicate with a UAV via an antenna beam while charging it, and this communication may be further used to change the posture and position of the UAV to the site. Yet another advantage of embodiments herein is that they enable to perform route planning of the track of a UAV while visiting multiple sites, without requiring a field technician carry the UAV from site to site. Both of these advantages may be understood to enable to reduce signalling, to adapt to UAV charging. This translates into more efficiency in the use of time-frequency resources, e.g., by pre-allocation and usage of RPC.

Figure 14:
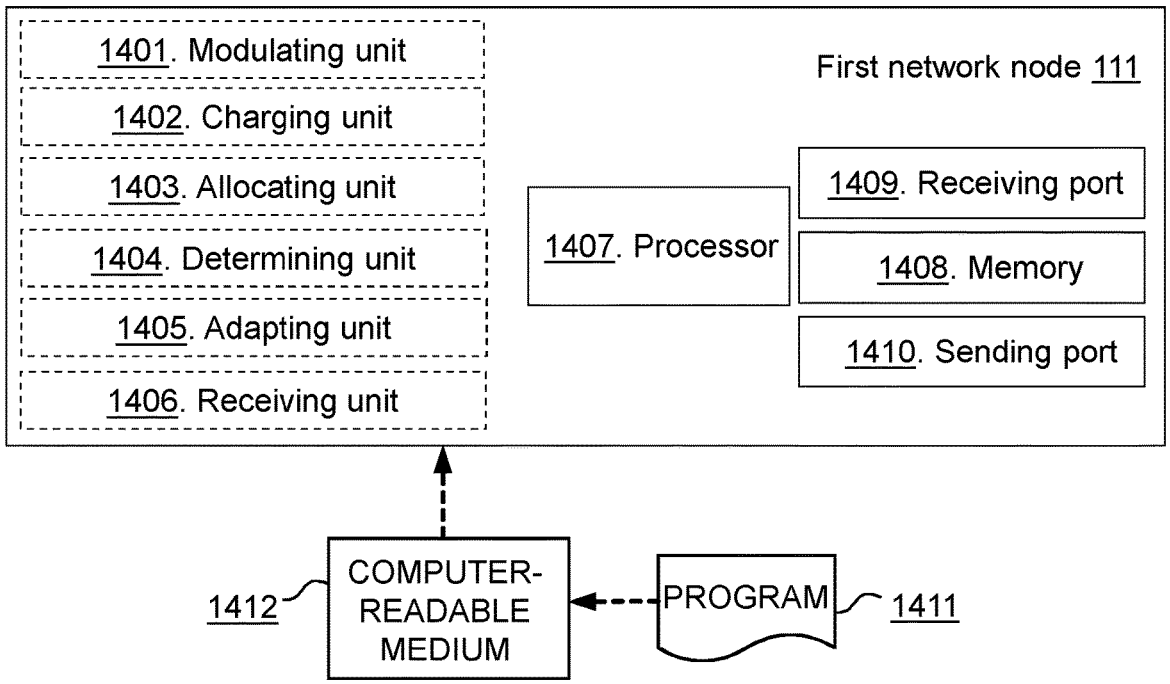
FIG. 14 is a schematic block diagram illustrating two non-limiting examples, a) and b), of a first network node, according to embodiments herein.
Figure 14:
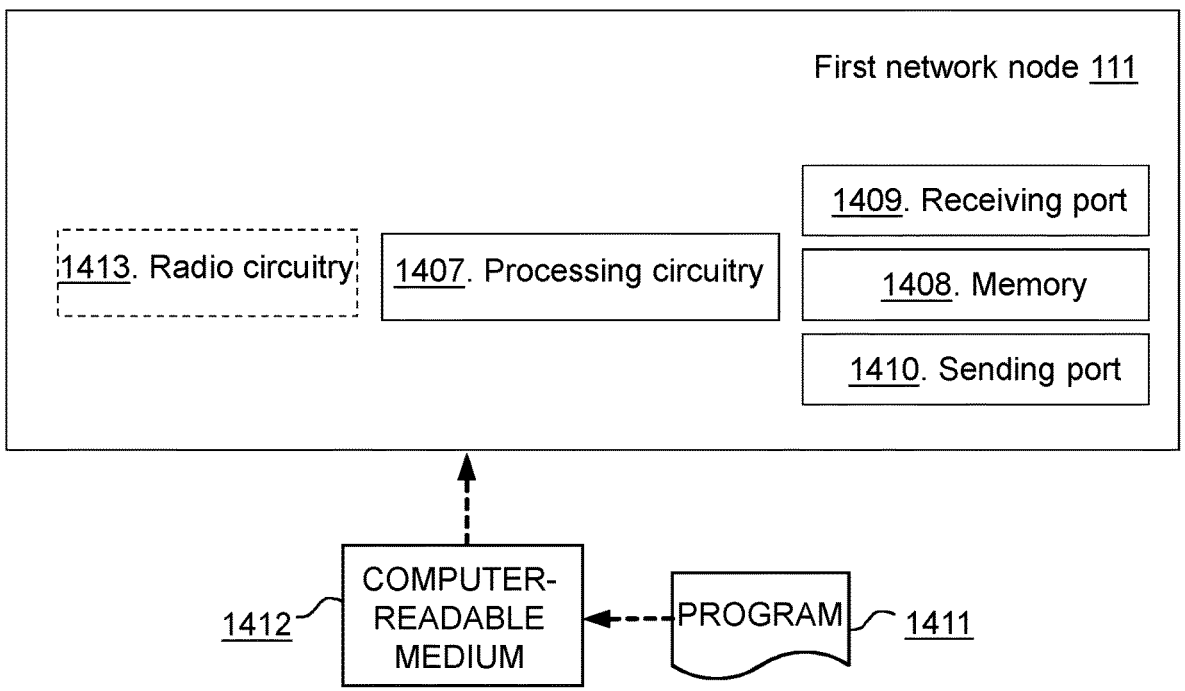

FIG. 14 depicts two different examples in panels a) and b), respectively, of the arrangement that the first network node 111 may comprise. In some embodiments, the first network node 111 may comprise the following arrangement depicted in FIG. 14a. The first network node 111 may be understood to be for handling the charging of the wireless device 130. The first network node 111 and the wireless device 130 may be configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 14, optional units are indicated with dashed boxes.

The detailed description of some of the following corresponds to the same references provided above, in relation to the actions described for the first network node 111, and will thus not be repeated here. For example, the allocation, or reallocation, of the number of antenna beams may be configured to be prepared in advance and pre-allocated, for example, via a network slice.

The first network node 111 is configured to perform the modulating of Action 307, e.g., by means of a modulating unit 1401 within the first network node 111, configured to modulate the one or more beamforming beams 121 in the antenna array 124 configured to be controlled by the first network node 111 with the pulse width modulation.

In some embodiments, to modulate may be configured to comprise turning on and off each of the one or more beamforming beams 121 with the pulse width modulation sequence.

The first network node 111 is further configured to perform the charging of Action 308, e.g., by means of a charging unit 1402 within the first network node 111, configured to charge, wirelessly, the wireless device 130, with the one or more beamforming beams 121 configured to be modulated.

The first network node 111 may be further configured to perform the allocating of Action 303, e.g., by means of an allocating unit 1403 within the first network node 111, configured to allocate the one or more beamforming beams 121 to charge the wireless device 130. To modulate may be configured to be performed with the allocated one or more beamforming beams 121.

The first network node 111 may be further configured to perform the determining of Action 302, e.g., by means of a determining unit 1404 within the first network node 111, configured to determine the mode of operation of at least one of the one or more beamforming beams 121. The mode of operation may be configured to be selected from: the charging mode, and the non-charging mode. In such embodiments, to modulate may be configured to be performed with the one or more beamforming beams 121, according to the mode of operation configured to be determined.

The first network node 111 may be further configured to perform the determining of Action 304, e.g., by means of the determining unit 1404 within the first network node 111, configured to determine the pattern of arrangement of the one or more beams 121 In such embodiments, to charge may be configured to be performed with the one or more beamforming beams 121 arranged with the pattern configured to be determined.

In some of the embodiments, the first network node 111 may be further configured to modulate with the pattern of arrangement configured to be determined, e.g., of a synchronous pattern, and/or an asynchronous pattern, such as with a 90* phase shift.

In some embodiments, the pattern may be configured to be determined so to match the frequency and the impedance of the receiver of the one or more beams 121 in the wireless device 130.

The first network node 111 may be further configured to perform the adapting of Action 309, e.g., by means of an adapting unit 1405 within the first network node 111, configured to adapt the pattern configured to be determined based on the mobility of the wireless device 130 in the wireless communications network 100. In such embodiments, to charge may be configured to be performed with the pattern configured to be adapted.

The first network node 111 may be further configured to perform the determining of Action 305, e.g., by means of the determining unit 1404 within the first network node 111, configured to determine the power of transmission of the one or more beamforming beams 121 based on the distance between the antenna array 124 configured to transmit the one or more beamforming beams 121 and the wireless device 130. In such embodiments, to charge may be configured to be performed based on the power of transmission configured to be determined.

In some embodiments, the amount of power demand may be configured to be transferred via the control signal. The control signal may be configured to be one of: a) transmitted inside the one or more beamforming beams 121 configured to be used to charge the wireless device 130, and b) transmitted separately from the one or more beamforming beams 121 configured to be used to charge the wireless device 130.

The first network node 111 may be further configured to perform the determining of Action 306, e.g., by means of the determining unit 1404 within the first network node 111, configured to determine at least one of the polarization and the matching. In such embodiments, to modulate may be configured to be performed with the polarization and matching configured to be determined.

The first network node 111 may be further configured to perform the receiving of Action 301, e.g., by means of a receiving unit 1406 within the first network node 111, configured to receive, from the wireless device 130, the first indication configured to request the start of the charging session. In such embodiments, to modulate may be configured to be performed based on the first indication configured to be received.

The first network node 111 may be further configured to perform the receiving of Action 310, e.g., by means of a receiving unit 1406 within the first network node 111, configured to receive the second indication from the wireless device 130 configured to signal the end of the charging session, once the charging of the wireless device 130 may be configured to have been completed.

The embodiments herein in the first network node 111 may be implemented through one or more processors, such as a processor 1407 in the first network node 111 depicted in FIG. 14a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1408 comprising one or more memory units. The memory 1408 is arranged to be used to store obtained information, store data, configurations, schedulings, and applications etc. to perform the methods herein when being executed in the first network node 111.

In some embodiments, the first network node 111 may receive information from, e.g., the other first network nodes of the one or more first network nodes 110, the second node 102, or the wireless device 130, through a receiving port 1409. In some embodiments, the receiving port 1409 may be, for example, connected to one or more antennas in first network node 111. In other embodiments, the first network node 111 may receive information from another structure in the wireless communications network 100 through the receiving port 1409. Since the receiving port 1409 may be in communication with the processor 1407, the receiving port 1409 may then send the received information to the processor 1407. The receiving port 1409 may also be configured to receive other information.

The processor 1407 in the first network node 111 may be further configured to transmit or send information to e.g., the other first network nodes of the one or more first network nodes 110, the second node 102, the wireless device 130, or another structure in the wireless communications network 100, through a sending port 1410, which may be in communication with the processor 1407, and the memory 1408.

Those skilled in the art will also appreciate that the units 1401-1406 described above may refer to a combination of analog and digital circuits, and/or one or more processors configured with software and/or firmware, e.g., stored in memory, that, when executed by the one or more processors such as the processor 1407, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1401-1406 described above may be implemented as one or more applications running on one or more processors such as the processor 1407.

Thus, the methods according to the embodiments described herein for the first network node 111 may be respectively implemented by means of a computer program 1411 product, comprising instructions, i.e., software code portions, which, when executed on at least one processor 1407, cause the at least one processor 1407 to carry out the actions described herein, as performed by the first network node 111. The computer program 1411 product may be stored on a computer-readable storage medium 1412. The computer-readable storage medium 1412, having stored thereon the computer program 1411, may comprise instructions which, when executed on at least one processor 1407, cause the at least one processor 1407 to carry out the actions described herein, as performed by the first network node 111. In some embodiments, the computer-readable storage medium 1412 may be a non-transitory computer-readable storage medium, such as a CD ROM disc, or a memory stick. In other embodiments, the computer program 1411 product may be stored on a carrier containing the computer program 1411 just described, wherein the carrier is one of an electronic signal, optical signal, radio signal, or the computer-readable storage medium 1412, as described above.

The first network node 111 may comprise a communication interface configured to facilitate, or an interface unit to facilitate, communications between the first network node 111 and other nodes or devices, e.g., the other first network nodes of the one or more first network nodes 110, the second node 102, the wireless device 130, or another structure. The interface may, for example, include a transceiver configured to transmit and receive radio signals over an air interface in accordance with a suitable standard.

In other embodiments, the first network node 111 may comprise the following arrangement depicted in FIG. 14b.

The first network node 111 may comprise a processing circuitry 1407, e.g., one or more processors such as the processor 1407, in the first network node 111 and the memory 1408. The first network node 111 may also comprise a radio circuitry 1413, which may comprise e.g., the receiving port 1409 and the sending port 1410. The processing circuitry 1407 may be configured to, or operable to, perform the method actions according to FIG. 3, FIGS. 4-6, and/or FIGS. 11-13, in a similar manner as that described in relation to FIG. 14*a*. The radio circuitry 1413 may be configured to set up and maintain at least a wireless connection with the other first network nodes of the one or more first network nodes 110, the second node 102, and/or the wireless device 130. Circuitry may be understood herein as a hardware component.

Hence, embodiments herein also relate to the first network node 111 operative to operate in the wireless communications network 100. The first network node 111 may comprise the processing circuitry 1407 and the memory 1408, said memory 1408 containing instructions executable by said processing circuitry 1407, whereby the first network node 111 is further operative to perform the actions described herein in relation to the first network node 111, e.g., in FIG. 3, FIGS. 4-6, and/or FIGS. 11-13.

Figure 15:
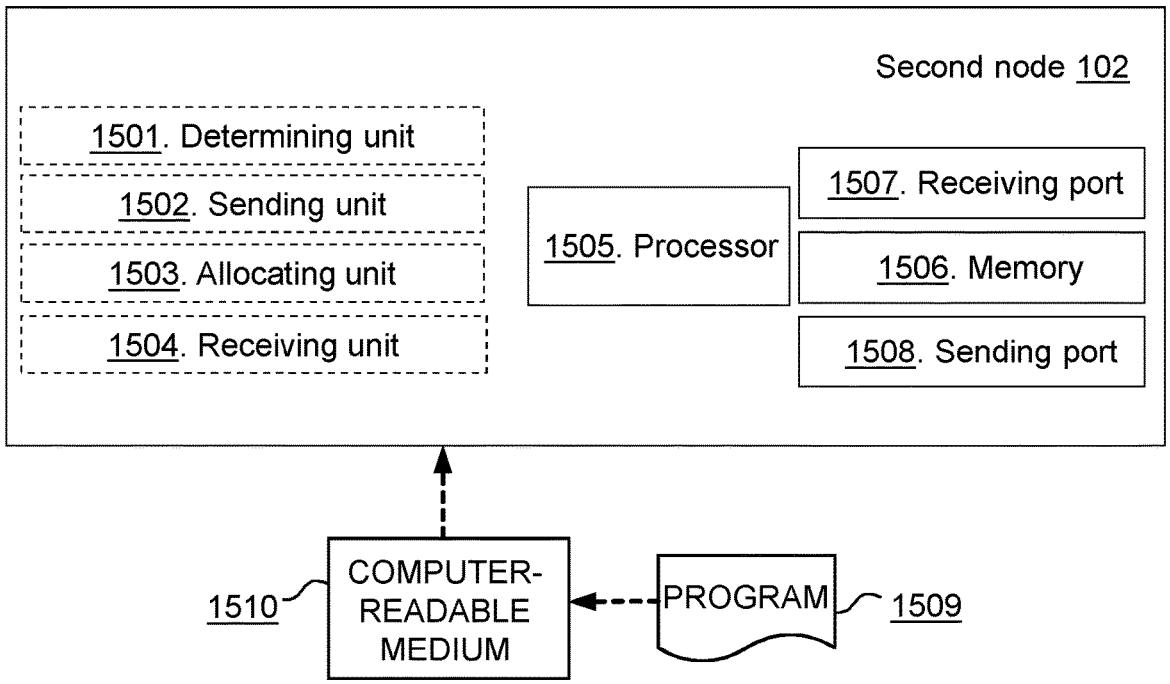
FIG. 15 is a schematic block diagram illustrating two non-limiting examples, a) and b), of a second node, according to embodiments herein.
Figure 15:
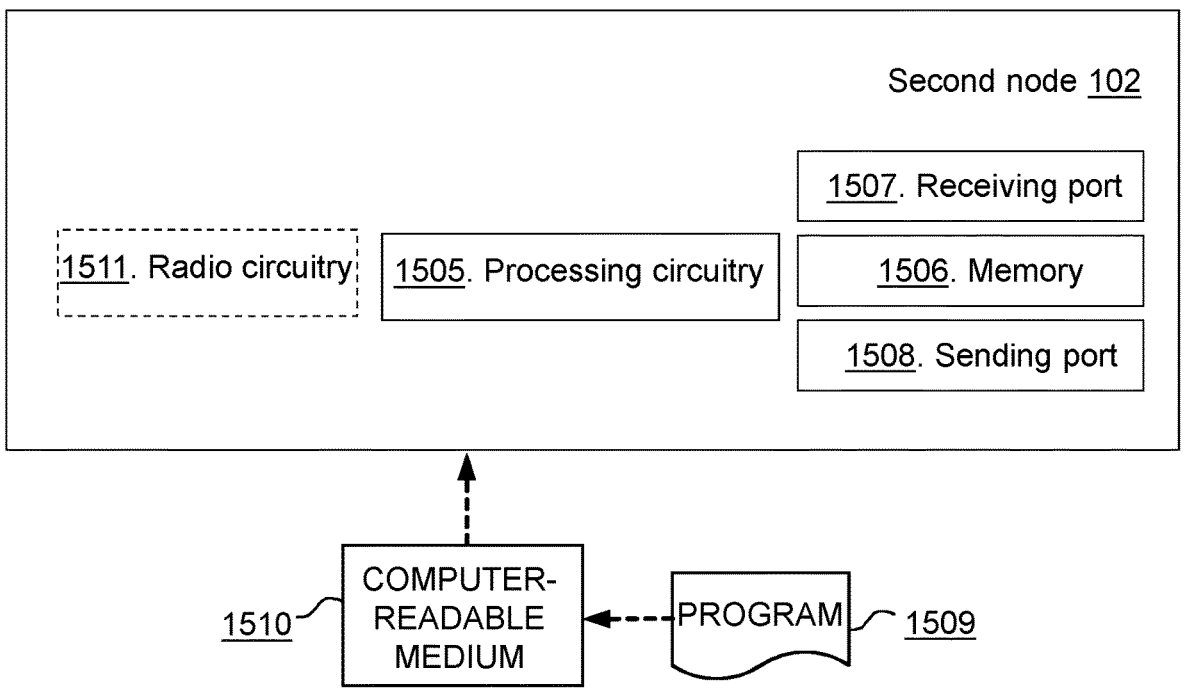

FIG. 15 depicts two different examples in panels a) and b), respectively, of the arrangement that the network node, also referred to herein as the second node 102, may comprise. In some embodiments, the second node 102 may comprise the following arrangement depicted in FIG. 15*a*. The second node 102 may be understood to be for handling the charging of the wireless device 130. The second node 102 and the wireless device 130 are configured to operate in the wireless communications network 100. The wireless device 130 is configured to be the UAV 131.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 15, optional units are indicated with dashed boxes.

The detailed description of some of the following corresponds to the same references provided above, in relation to the actions described for the second node 102, and will thus not be repeated here. For example, the allocation, or reallocation, of the number of antenna beams may be configured to be prepared in advance and pre-allocated, for example, via a network slice.

The second node 102 is configured to perform the determining of Action 702, e.g. by means of a transmitting unit 1501 within the second node 102, configured to, determine 702 the route 150 to be followed by the UAV 131 to reach the destination 160. The determining 702 the configured to be based on at least one of: i) the possibility of charging the battery of the UAV 131 via the beamforming beams 121, 122, 123 configured to be transmitted by the one or more first network nodes 110 configured to operate in the wireless communications network 100 along the route 150, ii) the estimated amount of energy needed by the UAV 131 along the route 150, and iii) the estimated amount of available energy in the UAV 131 along the route 150.

The second node 102 is configured to perform the sending of Action 704, e.g., by means of a sending unit 1502 within the second node 102, configured to, send the indication to the UAV 131. The indication is configured to indicate the route 150 configured to be determined.

In some embodiments, at least the first network node 111 of the one or more first network nodes 110 may be configured to be capable of: a) modulating the one or more beamforming beams 121 in the antenna array 124 configured to be controlled by the first network node 111 with the pulse width modulation, and b) charging, wirelessly, the UAV 131, with the one or more beamforming beams 121 configured to be modulated.

In some embodiments, to determine may be configured to be based on the capability of the first network node 111.

In some embodiments, the second node 102 may be further configured to perform the allocating of Action 703, e.g., by means of an allocating unit 1503 within the second node 102, configured to, allocate the one or more of the beamforming beams 121, 122, 123 in the route 150 configured to be determined to charge the UAV 131.

In some embodiments, the second node 102 may be further configured to perform the receiving of Action 701, e.g., by means of a receiving unit 1504 within the second node 102, configured to, receive the another indication from the UAV 131. The another indication may be configured to indicate the destination 160 of the UAV 131. In such embodiments, the route 150 configured to be determined may be configured to be based on the another indication configured to be received.

The embodiments herein in the second node 102 may be implemented through one or more processors, such as a processor 1505 in the second node 102 depicted in FIG. 15*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 102. One such carrier may be in the form of a CD ROM disc. It is however feasible with other data carriers such as a memory stick. The computer program code may furthermore be provided as pure program code on a server and downloaded to the second node 102.

The second node 102 may further comprise a memory 1506 comprising one or more memory units. The memory 1506 is arranged to be used to store obtained information, store data, configurations, schedulings, and applications etc. to perform the methods herein when being executed in the second node 102.

In some embodiments, the second node 102 may receive information from, e.g., the first network node 111, the other first network nodes of the one or more first network nodes 110, and/or the wireless device 130, through a receiving port 1507. In some embodiments, the receiving port 1507 may be, for example, connected to one or more antennas in second node 102. In other embodiments, the second node 102 may receive information from another structure in the wireless communications network 100 through the receiving port 1507. Since the receiving port 1507 may be in communication with the processor 1505, the receiving port 1507 may then send the received information to the processor 1505. The receiving port 1507 may also be configured to receive other information.

The processor 1505 in the second node 102 may be further configured to transmit or send information to e.g., the first network node 111, the other first network nodes of the one or more first network nodes 110, the wireless device 130, and/or another structure in the wireless communications network 100, through a sending port 1508, which may be in communication with the processor 1505, and the memory 1506.

Those skilled in the art will also appreciate that the units 1501-1504 described above may refer to a combination of analog and digital circuits, and/or one or more processors configured with software and/or firmware, e.g., stored in memory, that, when executed by the one or more processors such as the processor 1505, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1501-1504 described above may be implemented as one or more applications running on one or more processors such as the processor 1505.

Thus, the methods according to the embodiments described herein for the second node 102 may be respectively implemented by means of a computer program 1509 product, comprising instructions, i.e., software code portions, which, when executed on at least one processor 1505, cause the at least one processor 1505 to carry out the actions described herein, as performed by the second node 102. The computer program 1509 product may be stored on a computer-readable storage medium 1510. The computer-readable storage medium 1510, having stored thereon the computer program 1509, may comprise instructions which, when executed on at least one processor 1505, cause the at least one processor 1505 to carry out the actions described herein, as performed by the second node 102. In some embodiments, the computer-readable storage medium 1510 may be a non-transitory computer-readable storage medium, such as a CD ROM disc, or a memory stick. In other embodiments, the computer program 1509 product may be stored on a carrier containing the computer program 1509 just described, wherein the carrier is one of an electronic signal, optical signal, radio signal, or the computer-readable storage medium 1510, as described above.

The second node 102 may comprise a communication interface configured to facilitate, or an interface unit to facilitate, communications between the second node 102 and other nodes or devices, e.g., the first network node 111, the other first network nodes of the one or more first network nodes 110, the wireless device 130, and/or another structure in the wireless communications network 100. The interface may, for example, include a transceiver configured to transmit and receive radio signals over an air interface in accordance with a suitable standard.

In other embodiments, the second node 102 may comprise the following arrangement depicted in FIG. 15b. The second node 102 may comprise a processing circuitry 1505, e.g., one or more processors such as the processor 1505, in the second node 102 and the memory 1506. The second node 102 may also comprise a radio circuitry 1511, which may comprise e.g., the receiving port 1507 and the sending port 1508. The processing circuitry 1505 may be configured to, or operable to, perform the method actions according to FIG. 7, FIGS. 8-9, and/or FIG. 12, in a similar manner as that described in relation to FIG. 15a. The radio circuitry 1511 may be configured to set up and maintain at least a wireless connection with the first network node 111, the other first network nodes of the one or more first network nodes 110, the wireless device 130 and/or another structure. Circuitry may be understood herein as a hardware component.

Hence, embodiments herein also relate to the second node 102 operative to operate in the wireless communications network 100. The second node 102 may comprise the processing circuitry 1505 and the memory 1506, said memory 1506 containing instructions executable by said processing circuitry 1505, whereby the second node 102 is further operative to perform the actions described herein in relation to the second node 102, e.g., in FIG. 7, FIGS. 8-9, and/or FIG. 12.

Figure 16:
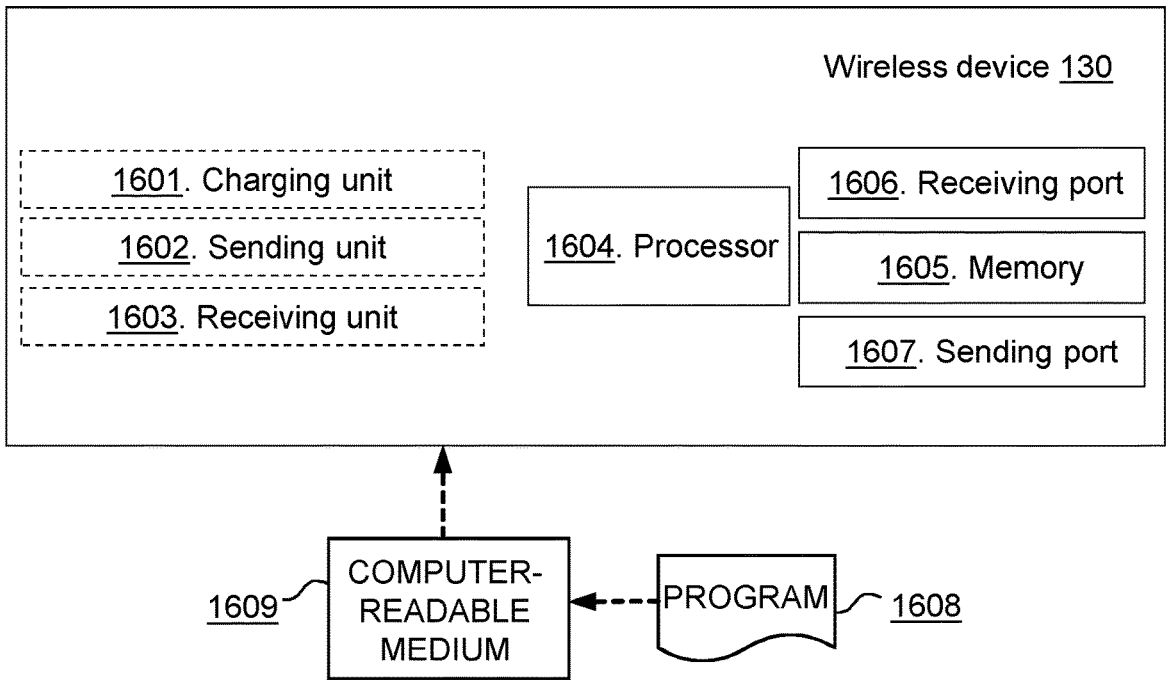
FIG. 16 is a schematic block diagram illustrating two non-limiting examples, a) and b), of a wireless device, according to embodiments herein.
Figure 16:
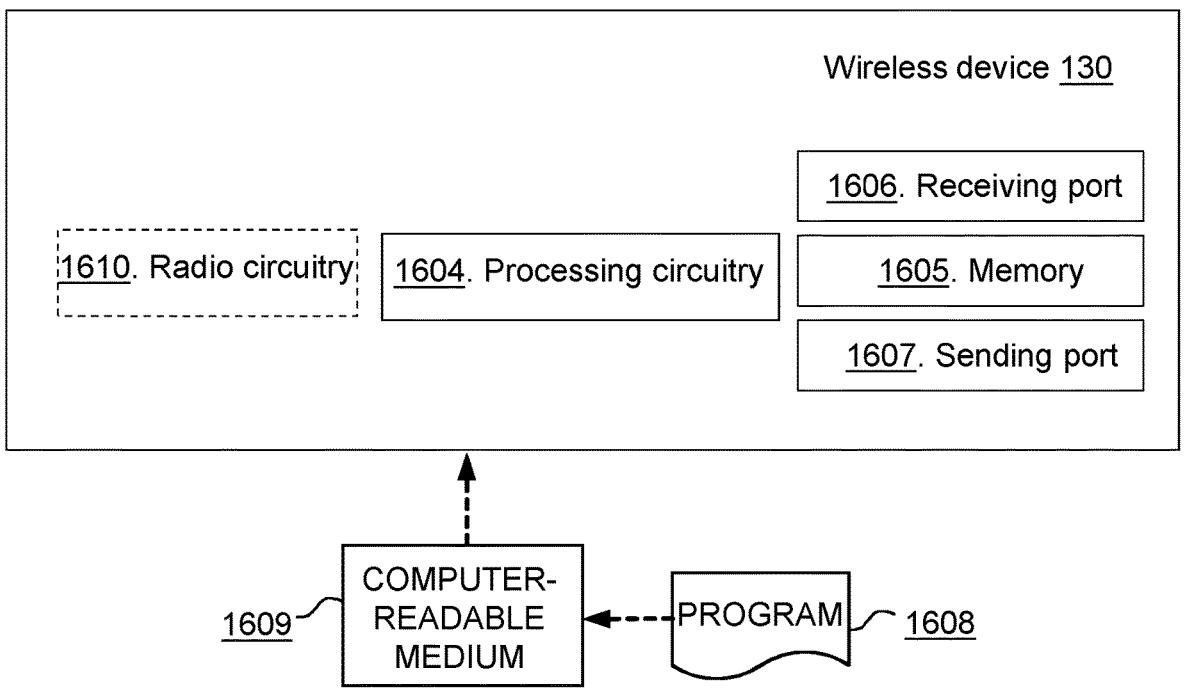

FIG. 16 depicts two different examples in panels a) and b), respectively, of the arrangement that the wireless device 130 may comprise. In some embodiments, the wireless device 130 may comprise the following arrangement depicted in FIG. 16a. The wireless device 130 may be understood to be for handling the charging by the first network node 111 of the wireless device 130. The first network node 111 and the wireless device 130 are configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 16, optional units are indicated with dashed boxes.

The detailed description of some of the following corresponds to the same references provided above, in relation to the actions described for the second node 102, and will thus not be repeated here. For example, the wireless device 130 may be an FSO drone, an IoT device or a CPE, such as a WiFi equipment used internally in a building.

The wireless device 130 is configured to perform the charging of Action 1004 action, e.g. by means of a charging unit 1601 within the wireless device 130, configured to charge, wirelessly, by being configured to receive, from the first network node 111, the one or more beamforming beams 121 configured to be modulated with the pulse width modulation.

The wireless device 130 may be configured to perform the sending of Action 1001, e.g., by means of a sending unit 1602 within the wireless device 130, configured to send to the first network node 111, the first indication configured to request the start of the charging session. In such embodiments, to charge may be configured to be performed based on the first indication configured to be sent.

The wireless device 130 may be configured to perform the sending of Action 1005, e.g., by means of the sending unit 1602 within the wireless device 130, configured to send the second indication to the first network node 111 configured to signal the end of the charging session. This may be configured to be performed once the charging of the wireless device 130 may be configured to have been completed.

In some embodiments, the amount of power demand may be configured to be transferred via a control signal. The control signal may be configured to be one of: a) received inside the one or more beamforming beams 121 configured to be used to charge the wireless device 130, and b) received separately from the one or more beamforming beams 121 configured to be used to charge the wireless device 130.

In some embodiments wherein the wireless device 130 may be configured to be the UAV 131, the wireless device 130 may be configured to perform the sending of Action 1001, e.g., by means of the sending unit 1602 within the wireless device 130, configured to send the third indication to the second node 102 configured to operate in the wireless communications network 100. The third indication may be configured to indicate the destination 160 of the UAV 131.

The wireless device 130 may be configured to perform the receiving of Action 1002, e.g., by means of a receiving unit 1603 within the wireless device 130, configured to receive, based on the third indication configured to be sent, the fourth indication from the second node 102. The fourth indication may be configured to indicate the route 150 to be followed by the UAV 131 to reach the destination 160. The indication may be configured to be based on at least one of: i) the possibility of charging the battery of the UAV 131 via the beamforming beams 121, 122, 123 configured to be transmitted by the one or more first network nodes 110 configured to operate in the wireless communications network 100 along the route 150, ii) the estimated amount of energy needed by the UAV 131 along the route 150, and iii) the estimated amount of available energy in the UAV 131 along the route 150. In such embodiments, the first network node 111 may be configured to be comprised in the route 150.

The embodiments herein in the wireless device 130 may be implemented through one or more processors, such as a processor 1604 in the wireless device 130 depicted in FIG. 16*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 1605 comprising one or more memory units. The memory 1605 is arranged to be used to store obtained information, store data, configurations, schedulings, and applications etc. to perform the methods herein when being executed in the wireless device 130.

In some embodiments, the wireless device 130 may receive information from, e.g., the second node 102, or the first network node 111, and/or the other first network nodes of the one or more first network nodes 110, through a receiving port 1606. In some embodiments, the receiving port 1606 may be, for example, connected to one or more antennas in wireless device 130. In other embodiments, the wireless device 130 may receive information from another structure in the wireless communications network 100 through the receiving port 1606. Since the receiving port 1606 may be in communication with the processor 1604, the receiving port 1606 may then send the received information to the processor 1604. The receiving port 1606 may also be configured to receive other information.

The processor 1604 in the wireless device 130 may be further configured to transmit or send information to e.g., the second node 102, the first network node 111, the other first network nodes of the one or more first network nodes 110 and/or another structure in the wireless communications network 100, through a sending port 1607, which may be in communication with the processor 1604, and the memory 1605.

Those skilled in the art will also appreciate that the units 1601-1603 described above may refer to a combination of analog and digital circuits, and/or one or more processors configured with software and/or firmware, e.g., stored in memory, that, when executed by the one or more processors such as the processor 1604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1601-1603 described above may be implemented as one or more applications running on one or more processors such as the processor 1604.

Thus, the methods according to the embodiments described herein for the wireless device 130 may be respectively implemented by means of a computer program 1608 product, comprising instructions, i.e., software code portions, which, when executed on at least one processor 1604, cause the at least one processor 1604 to carry out the actions described herein, as performed by the wireless device 130. The computer program 1608 product may be stored on a computer-readable storage medium 1609. The computer-readable storage medium 1609, having stored thereon the computer program 1608, may comprise instructions which, when executed on at least one processor 1604, cause the at least one processor 1604 to carry out the actions described herein, as performed by the wireless device 130. In some embodiments, the computer-readable storage medium 1609 may be a non-transitory computer-readable storage medium, such as a CD ROM disc, or a memory stick. In other embodiments, the computer program 1608 product may be stored on a carrier containing the computer program 1608 just described, wherein the carrier is one of an electronic signal, optical signal, radio signal, or the computer-readable storage medium 1609, as described above.

The wireless device 130 may comprise a communication interface configured to facilitate, or an interface unit to facilitate, communications between the wireless device 130 and other nodes or devices, e.g., the second node 102, or the first network node 111, the other first network nodes of the one or more first network nodes 110 and/or another structure. The interface may, for example, include a transceiver configured to transmit and receive radio signals over an air interface in accordance with a suitable standard.

In other embodiments, the wireless device 130 may comprise the following arrangement depicted in FIG. 16*b*. The wireless device 130 may comprise a processing circuitry 1604, e.g., one or more processors such as the processor 1604, in the wireless device 130 and the memory 1605. The wireless device 130 may also comprise a radio circuitry 1610, which may comprise e.g., the receiving port 1606 and the sending port 1607. The processing circuitry 1604 may be configured to, or operable to, perform the method actions according to FIG. 10, FIGS. 8-9, and/or FIG. 12, in a similar manner as that described in relation to FIG. 16*a*. The radio circuitry 1610 may be configured to set up and maintain at least a wireless connection with the first network node 111, the other first network nodes of the one or more first network nodes 110, the second node 102, or and/or another structure. Circuitry may be understood herein as a hardware component.

Hence, embodiments herein also relate to the wireless device 130 operative to operate in the wireless communications network 100. The wireless device 130 may comprise the processing circuitry 1604 and the memory 1605, said 1605 containing instructions executable by said processing circuitry 1604, whereby the wireless device 130 is further operative to perform the actions described herein in relation to the wireless device 130, e.g., in FIG. 10, FIGS. 8-9, and/or FIG. 12.

Figure 17:
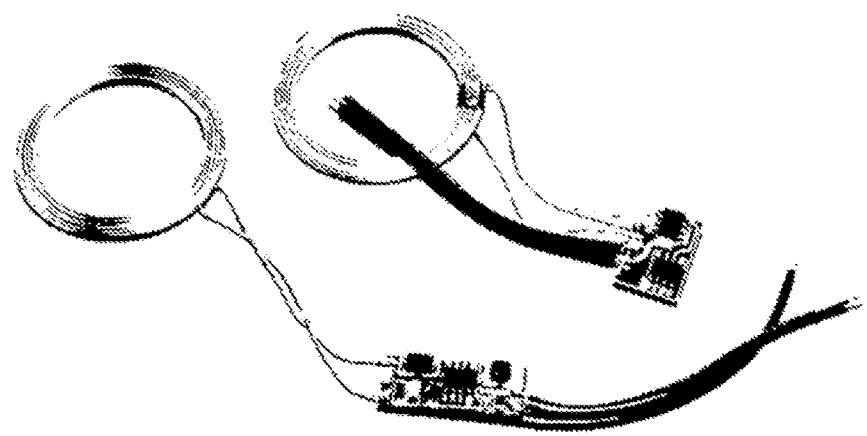
FIG. 17 is a schematic diagram illustrating an example of a WPT receivers placed on an UAV, according to embodiments herein.

The wireless device 130 may further comprise a wireless charging component, a non-limiting example of which is shown in FIG. 17. A PWT induction unit, or WPT receiver, may be placed on the wireless device 130 and deliver power to the wireless device 130.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method performed by a first network node of a wireless communications network for charging of a wireless device, the method comprising:
    selecting a mode of operation for one or more beamforming beams generated by an antenna array controlled by the first network node, wherein the mode of operation is selected from the following:
        a non-charging mode in which the one or more beamforming beams are arranged to carry data traffic, and
        a charging mode in which the one or more beamforming beams are arranged to charge the wireless device;
    based on selecting the charging mode:
        modulating the one or more beamforming beams by turning on and off each of the one or more beamforming beams according to a pulse width modulation sequence; and
        transmitting the modulated one or more beamforming beams, via the antenna array, for wireless charging of the wireless device;
    based on selecting the non-charging mode, transmitting the one or more beamforming beams carrying the data traffic to the wireless via the antenna array, wherein the one or more beamforming beams carry the data traffic without being turned on and off according to the pulse width modulation sequence.

2. The method according to claim 1, wherein:
    the method further comprises determining a pattern of arrangement of the one or more beams based on one or more of the following:
        a frequency and an impedance of a receiver of the one or more beams in the wireless device, and
        mobility of the wireless device in the wireless communication network; and
    the one or more modulated beamforming beams are transmitted according to the determined pattern of arrangement.

3. The method according to claim 1, wherein:
    the method further comprises determining a transmission power of the one or more beamforming beams based on a distance between the antenna array and the wireless device; and
    the one or more modulated beamforming beams are transmitted according to the determined transmission power.

4. The method according to claim 1, further comprising receiving, from the wireless device, an indication of a power demand of the wireless device, wherein the one or more modulated beamforming beams are transmitted according to indicated power demand of the wireless device.

5. The method according to claim 1, further comprising:
    receiving from the wireless device a first indication requesting a start of a charging session, wherein modulating and transmitting the one or more beamforming beams are initiated responsive to the first indication; and
    receiving from the wireless device a second indication of an end of the charging session and/or that the charging session has been completed, wherein modulating and transmitting the one or more beamforming beams are terminated responsive to the second indication.

6. A first network node comprising processing circuitry and communication interface circuitry configured to perform operations corresponding to the method of claim 1, and further configured to charge the wireless device in the wireless communications network,
    wherein the communication interface circuitry is operably coupled to the antenna array; and
    wherein the processing circuitry is operably coupled to the communication interface circuitry.

7. The first network node according to claim 6, wherein the processing circuitry and the communication interface circuitry are further configured to:
    receive from the wireless device a first indication requesting a start of a charging session;
    receive from the wireless device a second indication of an end of the charging session and/or that the charging session has been completed; and
    based on selecting the charging mode:

initiate modulating and transmitting the one or more beamforming beams responsive to the first indication; and terminate modulating and transmitting the one or more beamforming beams responsive to the second indication.

8. A method performed by a second network node to support charging of a wireless device operating as an Unmanned Aerial Vehicle (UAV) in a wireless communications network, the method comprising:

determining a route to be followed by the UAV, based on at least one of the following:
capability of one or more first network nodes of the wireless communications network, that are along the route, of wirelessly charging a battery of the UAV via modulation of beamforming beams,
an estimated amount of energy needed by the UAV along the route, and
an estimated amount of energy available in the UAV along the route;

sending to the UAV an indication of the determined route, wherein the determined route includes charging coverage of one or more beamforming beams transmitted by an antenna array controlled by one of the first network nodes; and sending to the first network node a further indication to control selection of a mode of operation, including a charging mode for charging the UAV with the one or more beamforming beams and a non-charging mode in which the one or more beamforming beams are arranged to carry data traffic;
wherein in the charging mode, each of the one or more beamforming beams is modulated by being turned on and off according to a pulse width modulation sequence;
wherein in the non-charging mode, the one or more beamforming beams carry the data traffic without being turned on and off according to the pulse width modulation sequence.

9. The method according to claim 8, further comprising receiving from the UAV an indication of a destination of the UAV, wherein the route is determined further based on the indicated destination of the UAV.

10. A second network node comprising processing circuitry and communication interface circuitry configured to perform operations corresponding to the method of claim 8, and further configured to support charging of the wireless device operating as the Unmanned Aerial Vehicle (UAV) in the wireless communications network,
wherein the communication interface circuitry is configured to communicate with the UAV; and
wherein the processing circuitry is operably coupled to the communication interface circuitry.

11. A method performed by a wireless device to support charging by and receiving data traffic from a first network node of a wireless communications network, the method comprising:
based on the first network node selecting a charging mode for one or more beamforming beams generated by an antenna array controlled by the first network node:
receiving the one or more beamforming beams transmitted by the first network node via the antenna array, wherein each of the one or more beamforming beams is modulated by the first network node by being turned on and off according to a pulse width modulation sequence; and
charging the wireless device based on transferring energy from the received one or more beamforming beams to a battery of the wireless device; and
based on the first network node selecting a non-charging mode for the one or more beamforming beams, receiving the one or more beamforming beams transmitted by the first network node via the antenna array, wherein each of the one or more beamforming beams carries the data traffic without being turned on and off according to the pulse width modulation sequence.

12. The method according to claim 11, further comprising:
sending to the first network node a first indication requesting a start of a charging session, wherein receiving the one or more beamforming beams modulated according to the pulse width modulation sequence is responsive to sending the first indication; and
sending to the first network node a second indication of an end of the charging session and/or that the charging session has been completed.

13. The method of claim 12, further comprising determining that the charging session has been completed based on an amount of energy transferred from the received one or more beamforming beams modulated according to the pulse width modulation sequence, wherein sending the second indication is responsive to determining that the charging session has been completed.

14. The method according to claim 11, further comprising sending to the first network node an indication of a power demand of the wireless device, wherein the received one or more beamforming beams are modulated according to the pulse width modulation sequence and transmitted by the first network node according to the indicated power demand.

15. The method according to claim 12, wherein the wireless device is an Unmanned Aerial Vehicle (UAV), and the method further comprises:
sending, to a second network node of the wireless communications network, an indication of a destination of the UAV; and
receiving, from the second node, an indication of a route to be followed by the UAV to reach the destination, wherein the indicated route is based on at least one of the following:
the first network node being along the indicated route;
capability of the first network node to wirelessly charge a battery of the UAV via modulation of beamforming beams,
an estimated amount of energy needed by the UAV along the indicated route, and
an estimated amount of energy available in the UAV along the indicated route.

16. The method of claim 15, wherein charging the wireless device is performed based on transferring energy from the one or more beamforming beams received along the indicated route.

17. A wireless device comprising processing circuitry and communication interface circuitry configured to perform operations corresponding to the method of claim 11, and further configured to support charging by the first network node of the wireless communications network,
wherein the communication interface circuitry is configured to communicate with at least the first network node; and
wherein the processing circuitry is operably coupled to the communication interface circuitry.

18. The wireless device according to claim 17, wherein the wireless device is an Unmanned Aerial Vehicle (UAV), and wherein the processing circuitry and the communication interface circuitry are further configured to:
- send, to a second network node of the wireless communications network, an indication of a destination of the UAV; and
- receive, from the second node, an indication of a route to be followed by the UAV to reach the destination, wherein the indicated route is based on at least one of the following:
  - the first network node being along the indicated route;
  - capability of the first network node to wirelessly charge a battery of the UAV via modulation of beamforming beams,
  - an estimated amount of energy needed by the UAV along the indicated route, and
  - an estimated amount of energy available in the UAV along the indicated route.

* * * * *